(12) United States Patent
Fischer

(10) Patent No.: US 12,039,489 B2
(45) Date of Patent: Jul. 16, 2024

(54) IDENTIFYING PRODUCT USING CONVEYOR PATTERN

(71) Applicant: Hugo Enterprises, LLC, Denver, CO (US)

(72) Inventor: Morgan Forrester Fischer, Upper Brookville, NY (US)

(73) Assignee: Hugo Enterprises, LLC, Denver, CO (US)

( * ) Notice: Subject to any disclaimer, the term of this patent is extended or adjusted under 35 U.S.C. 154(b) by 912 days.

(21) Appl. No.: 16/949,191

(22) Filed: Oct. 19, 2020

(65) Prior Publication Data
US 2022/0122027 A1 Apr. 21, 2022

(51) Int. Cl.
*G06Q 10/087* (2023.01)
*G06K 7/14* (2006.01)
*G06Q 50/04* (2012.01)
*G06T 7/00* (2017.01)
*G06V 10/75* (2022.01)

(52) U.S. Cl.
CPC .......... *G06Q 10/087* (2013.01); *G06Q 50/04* (2013.01); *G06T 7/001* (2013.01); *G06V 10/751* (2022.01); *G06K 7/1413* (2013.01); *G06K 7/1417* (2013.01); *G06T 2207/30108* (2013.01); *G06T 2207/30204* (2013.01)

(58) Field of Classification Search
CPC .... G06Q 10/087; G06Q 50/04; G06K 7/1417; G06K 9/6202; G06K 7/1413; G06T 7/001; G06T 2207/30108; G06T 2207/30204; G06V 10/751
See application file for complete search history.

(56) References Cited

U.S. PATENT DOCUMENTS

| | | | |
|---|---|---|---|
| 4,398,637 A | 8/1983 | Fleury | |
| 4,972,494 A * | 11/1990 | White | B65B 19/28 |
| | | | 209/535 |
| 5,244,080 A | 9/1993 | Bierbaum | |

(Continued)

FOREIGN PATENT DOCUMENTS

| | | |
|---|---|---|
| DE | 4325073.4 C2 | 10/1996 |
| DE | 19536308.6 C1 | 10/1996 |

(Continued)

OTHER PUBLICATIONS

International Search Report and Written Opinion for PCT Application No. PCT/US2021/071736, mailed on Jan. 20, 2022, 11 pages.

*Primary Examiner* — Michael Collins
(74) *Attorney, Agent, or Firm* — Brake Hughes Bellermann LLP

(57) ABSTRACT

A method comprises: receiving, in a computer system, a pattern record corresponding to a conveyor pattern of a conveyor belt in which patterns are randomly distributed; capturing, using the computer system, a first image of the conveyor belt while a first product is positioned on the conveyor belt; comparing, using the computer system, at least part of the first image with the pattern record to identify a first corresponding portion of the pattern record for the first image; assigning, using the computer system, a first identifier to the first product based on the first corresponding portion of the pattern record; and tracking, using the computer system, the first product using the assigned first identifier.

24 Claims, 20 Drawing Sheets

(56) References Cited

U.S. PATENT DOCUMENTS

| | | | |
|---|---|---|---|
| 6,669,091 B2 | 12/2003 | Wurz et al. | |
| 6,789,735 B1 | 9/2004 | Schnell | |
| 8,301,298 B2 | 10/2012 | Bisse | |
| 8,827,082 B2 | 9/2014 | Radema et al. | |
| 9,159,126 B2 * | 10/2015 | Johnson | G06T 7/0008 |
| 9,230,146 B1 | 1/2016 | Guidetti et al. | |
| 9,412,160 B2 * | 8/2016 | Johnson | A22C 17/008 |
| 9,599,459 B1 | 3/2017 | Janicki | |
| 9,881,366 B2 * | 1/2018 | Johnson | A22C 17/0093 |
| 10,471,478 B2 * | 11/2019 | Gil | B65G 15/30 |
| 10,643,116 B1 * | 5/2020 | Strater, Jr. | G06K 19/0723 |
| 11,090,689 B2 * | 8/2021 | Gil | B07C 7/005 |
| 2002/0031995 A1 | 3/2002 | Melville | |
| 2003/0168317 A1 * | 9/2003 | Fromme | G06T 7/0004 |
| | | | 198/502.1 |
| 2004/0177011 A1 | 9/2004 | Ramsay et al. | |
| 2008/0183303 A1 | 7/2008 | West | |
| 2017/0249491 A1 * | 8/2017 | Macintosh | G06V 20/20 |
| 2017/0290345 A1 * | 10/2017 | Garden | A21C 9/08 |
| 2018/0311704 A1 * | 11/2018 | Gil | B07C 3/08 |
| 2019/0270197 A1 * | 9/2019 | Wagner | B65G 47/766 |
| 2023/0172218 A1 * | 6/2023 | Beverly | A22C 17/0093 |
| | | | 705/3 |

FOREIGN PATENT DOCUMENTS

| | | |
|---|---|---|
| EP | 0359010 A1 | 3/1990 |
| EP | 0421164 A1 | 4/1991 |
| EP | 0527542 A1 | 2/1993 |
| EP | 1817732 B1 | 3/2017 |
| JP | 2012025538 A | 2/2012 |
| WO | 1990016041 | 12/1990 |

* cited by examiner

IDENTIFYING PRODUCT USING CONVEYOR PATTERN

BACKGROUND

Products transported on a conveyor belt are sometimes identified by way of a special marking (e.g., a label, barcode or a radio-frequency identification (RFID) tag) applied to the product. Such identification can serve to track the product during a manufacturing stage or other processing.

However, it may not always be possible, practicable, or desirable to apply a marking to a product for purpose of tracking. For example, in a food processing plant the product (e.g., a portion of meat) may not be suitable for having a marking applied to it (e.g., due to a risk of contamination). As another example, even if the risk of contamination were resolved, the nature of the product (e.g., the texture of the surface of a food product during the course of a manufacturing process) may make it difficult or undesirable to apply any kind of marking to the product.

SUMMARY

In a first aspect, a method comprises: receiving, in a computer system, a pattern record corresponding to a conveyor pattern of a conveyor belt in which patterns are randomly distributed; capturing, using the computer system, a first image of the conveyor belt while a first product is positioned on the conveyor belt; comparing, using the computer system, at least part of the first image with the pattern record to identify a first corresponding portion of the pattern record for the first image; assigning, using the computer system, a first identifier to the first product based on the first corresponding portion of the pattern record; and tracking, using the computer system, the first product using the assigned first identifier.

Implementations can include any or all of the following features. The conveyor pattern comprises first and second patterns having a spatial relationship with each other, and wherein the comparison includes determining that the first pattern is visible in the first image and that the second pattern is not visible in the first image. The determination comprises using a distance between the first and second patterns, the distance included in the spatial relationship. The determination comprises using a direction between the first and second patterns, the direction included in the spatial relationship. The method further comprises registering a carrier pattern and associating the carrier pattern with the assigned first identifier. Registering the carrier pattern is done before the first product is placed on the conveyor belt. Registering the carrier pattern is done based on detection of the carrier pattern at a carrier that holds the first product. The method further comprises detecting station entry, the station entry comprising that the first product enters a station from the conveyor belt. The method further comprises detecting, after the station entry is detected, that a second product enters the conveyor belt at the station, and associating the second product with the assigned first identifier. Detecting the second product comprises: capturing, using the computer system, a second image of the conveyor belt while the second product is positioned on the conveyor belt; comparing, using the computer system, at least part of the second image with the pattern record to identify a second corresponding portion of the pattern record for the second image; assigning, using the computer system, a second identifier to the second product based on the second corresponding portion of the pattern record; and associating the assigned second identifier with the assigned first identifier. Tracking the first product comprises distinguishing a displacement of the first product on the conveyor belt from an occurrence that involves removal of the first product from the conveyor belt and placement of a second product on the conveyor belt. The pattern record is based on capturing images of the conveyor belt during an entire cycle of the conveyor belt. At least some of the images include distance markers, and wherein the distance markers are used in assigning the first identifier to the first product.

In a second aspect, a computer program product is stored in a non-transitory medium, the computer program product including instructions that when executed cause a processor to perform operations including: receiving, in a computer system, a pattern record corresponding to a conveyor pattern of a conveyor belt in which patterns are randomly distributed; capturing, using the computer system, a first image of the conveyor belt while a first product is positioned on the conveyor belt; comparing, using the computer system, at least part of the first image with the pattern record to identify a first corresponding portion of the pattern record for the first image; assigning, using the computer system, a first identifier to the first product based on the first corresponding portion of the pattern record; and tracking, using the computer system, the first product using the assigned first identifier.

In a third aspect, a method comprises: capturing, using a computer system, a first image of a conveyor belt while a first product is positioned on the conveyor belt, the conveyor belt having a conveyor pattern in which patterns are randomly distributed; identifying, using the computer system and based on the first image, a first pattern of the conveyor pattern as being currently covered by the first product; and identifying, using the computer system, the first product based on the identified first pattern.

Implementations can include any or all of the following features. Identifying the first pattern comprises identifying a second pattern of the conveyor pattern as being located adjacent the first product. Identifying the second pattern comprises comparing the second pattern to a pattern record corresponding to the conveyor pattern. The method further comprises: detecting station entry relative to a station associated with the conveyor belt; and tracking the first product through the station entry to another side of the station. The station entry comprises that the first product enters the station, and wherein tracking the first product comprises associating the first product with a second product leaving the station. Detecting the station entry comprises detecting that the first pattern becomes visible on the conveyor belt after the station. The method further comprises detecting also a third product as leaving the station, wherein tracking the first product comprises also associating the first product with the third product. The station entry comprises that a second product enters the station, and wherein tracking the first product comprises associating the first product with the second product having entered the station. The method further comprises identifying, before detecting the station entry, a second pattern of the conveyor pattern as being currently covered by the second product, wherein detecting the station entry comprises detecting that the second pattern becomes visible on the conveyor belt after the station. The method further comprises detecting also a third product as entering the station, wherein tracking the first product comprises also associating the first product with the third product.

DETAILED DESCRIPTION

Figure 1:
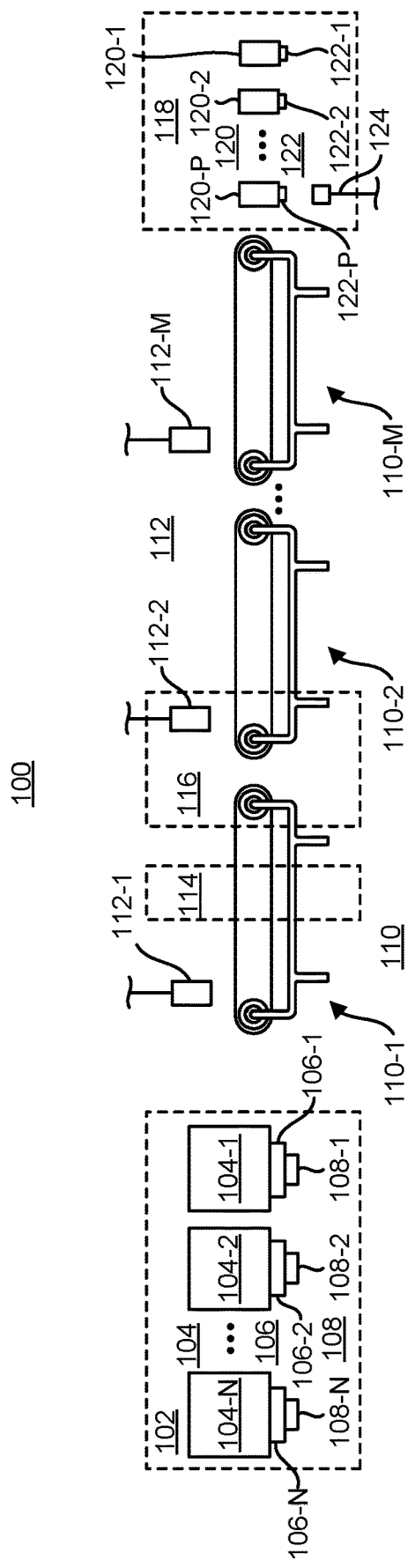
FIG. 1 shows an example of a system that facilitates traceability of a product.

The present disclosure describes systems, techniques, and/or articles of manufacture that facilitate tracking of a product or components thereof during, and/or after, a manufacturing process. In some implementations, a pattern is applied to a conveyor belt on which the product(s) can be placed, an image sensor captures one or more images of the conveyor belt, including at least part of the product and at least part of the pattern. In some implementations, the image sensor can initially capture multiple images while the belt is run through an entire loop (e.g., at every shift change, at the beginning of the day, once a week, once a month, or once a year, to name just a few examples). The multiple images can be cataloged or inventoried to form a complete visual representation of the belt surface for use as a reference in a tracking process. The product(s) can then be identified based on one or more aspects of the pattern that are visible to the image sensor in relation to one or more aspects of the pattern that are covered by the product on the conveyor belt. For example, the present subject matter can be applied in a meat processing plant where the product can include an animal carcass that is tracked by way of registering patterns on one or more conveyor belts on which the carcass, or a portion thereof, is placed. Implementations can provide improved source verification of one or more types of products. For example, the present subject matter can facilitate traceability of essentially all portions of an animal carcass to the original animal, including, but not limited to, for purposes of removing all pieces of a potentially unhealthy or contaminated animal from a food manufacturing process. As another example, the present subject matter can provide traceability of sub-components, components, apparatuses, and/or systems of an assembly process.

Examples described herein refer to patterns applied to a conveyor belt (e.g., to an outwardly facing surface thereof). A pattern includes one or more markings that can be uniquely identified using an image sensor. The markings can be synthetic (e.g., deliberately applied) and/or natural (e.g., including one or more unique features not designed/applied by deliberate action, including, but not limited to, irregularities from a manufacturing process). In some implementations, a pattern can include a so-called quick response ("QR") code. One or more types of QR code can be used. In some implementations, the QR code can be compatible with one or more standards. For example, the QR code can be compatible with the Association for Automatic Identification and Mobility International standard from 1997; the Japanese Industrial Standard X 0510; the International Organization for Standardization/International Electrotechnical Commission (ISO/IEC) 18004:200; the ISO/IEC standard 18004: 2006; and/or the ISO/IEC standard 18004:2015. In some implementations, a pattern can include a barcode. One or more types or barcode can be used. The barcode can be compatible with one or more symbologies. In some implementations, the barcode can be compatible with a linear symbology. For example, the linear symbology can be a discrete symbology (e.g., separating characters with a space that does not convey information). As another example, the linear symbology can be a continuous symbology (e.g., having characters that usually abut each other). As another example, the linear symbology can be a many-width (e.g., more than two-width) symbology (e.g., having relatively wider, and relatively narrower, bars and spaces). As another example, the linear symbology can be a two-height symbology (e.g., having relatively tall, and relatively short, bars and spaces). In some implementations, a pattern can include one or more geometric shapes in two or more dimensions. For example, the pattern can include one or more of a straight line, a curved line, a polygon, a regular shape, an irregular shape, a texture, a reflectivity, an elevation, or a depression, or combinations thereof. In some implementations, a pattern can include one or more regions of reduced material density, and/or one or more regions of increased material density. A reduced material density can include a recess or an opening in a material (e.g., a blind hole or a through hole).

A pattern in form of one or more applied markings can be based on any of multiple techniques for applying a pattern. A color and/or shading can be applied to the surface of the conveyor belt. In some implementations, a color/shading can be introduced as part of the process of manufacturing the conveyor belt. For example, the conveyor belt can be designed so that one or more patterns appear on its surface (e.g., by way of threading, interleaving, weaving, and/or inlay). In some implementations, a color/shading can be applied to an already manufactured conveyor belt. For example, this can be done to an existing conveyor belt in a factory setting without the need to obtain a new system of conveyor belts. In some implementations, pigment can be applied to the conveyor belt surface to form at least part of a pattern. For example, one or more types of paint can be applied. In some implementations, a dye can be applied to the conveyor belt surface to form at least part of a pattern. In some implementations, a pattern can be applied by affixing (e.g., permanently affixing) one or more objects to the surface of the conveyor belt. The object(s) can be made of any material that is suitable considering the operation of the conveyor belt and/or the types of products to be transported.

Examples herein refer to recognizing a pattern or otherwise determining that a product is positioned at or near a pattern. Patterns can be predefined in a pattern catalog, which can include any tangible medium permissive to at least temporary persistence of pattern information. In some implementations, a pattern catalog can be used by a processor-based system to recognize patterns. For example, such a pattern catalog can be embodied in any computer-readable non-transitory medium, including, but not limited to, in electronically stored digital information.

Examples herein refer to an association or a connection being generated between two or more patterns. An association and/or connection can be generated by a processor-based system as a way of defining a relationship between the patterns. For example, such an association and/or connection can include a pointer, flag, reference, string, tag, link, tie, and/or any other computer-readable piece of information that allows the system to recognize the defined relationship between the patterns.

Examples herein refer to two or more patterns having a spatial relationship with each other. A spatial relationship can include that the patterns are separated by a predefined distance (e.g., a first pattern is located R units of distance from a second pattern, where R is any positive number). A spatial relationship can include that the patterns are positioned in a predefined direction with regard to each other (e.g., a first pattern is located to the left of a second pattern when observed from a predefined perspective).

Examples herein refer to products and processes of manufacture. A product can include one or more materials, manufactures, and/or compositions of matter. A product can include natural material (e.g., meat or another animal product, and/or plant-based material) and/or synthetic material (e.g., metal, an alloy, a chemical compound, plastic, or another composite material). A product can refer to an item during any or all of multiple states of separation from one state into another. For example, in a meat processing plant a product can refer to a living animal, a slaughtered animal, a carcass, half of an animal carcass, a portion of an animal carcass, and/or a food item (e.g., a steak). A product can refer to an item during any or all of multiple states of assembly. For example, in an assembly process a product can refer to a sub-component of an apparatus; to a component of the apparatus including the sub-component; to the apparatus including the component; or to a system including the apparatus. In some implementations, a product can undergo both separation and assembly during manufacturing. In some implementations, a process of manufacture can include both separation and assembly of the product(s).

Examples herein refer to acts of identifying a product and/or to one or more identifiers for a product. An act of identifying can include one or more operations that ascertain the identity of the product, or otherwise render the product more distinguishable from at least one other product than otherwise. For example, the present subject matter can relate to one or more types of products (e.g., meat or other food products) where physical labeling of the individual product is impossible, prohibitively difficult, or otherwise undesirable. As another example, the present subject matter can relate to one or more types of products where it is not practical to rely on a container or an equivalent thereof being marked with some form of identifier for the product. In some implementations, an identification can include associating two or more identifiers with each other. For example, after associating a first identifier with a specific product (the first identifier not affixed to the product), an identification of the product can involve determining a second identifier that relates to the product (e.g., such that the product can be found using the second identifier), and associating the first and second identifiers with each other in a computer system. Such association of identifiers can involve one or more processing operations according to the following pseudo-code:
    system reads: identifier ID1
    system determines: the product is located at identifier ID1
    system reads: identifier ID2
    system determines: the product that was located at identifier ID1 (or part of that product, or an assembly including that product) is located at identifier ID2

That is, an identification can serve to establish a chain of association between two or more identifiers. Such identifiers can correspond to the product being in respective states of separation and/or states of assembly and/or modes of transportation in a manufacturing process. In some implementations, the associations are determined and recorded during the manufacturing process and preserved for possible later use. In some implementations, a preceding association is used during the manufacturing process to directly associate a new identifier with an original identifier.

The act of identification can involve using an identifier. In some implementations, an identifier is a unique token (e.g., one or more characters, such as letters and/or numbers) or other symbol (e.g., any digital information, or a combination of pieces of digital information) that is recognizable by a computer-based system (e.g., by a processor) and that can be distinguished from one or more other identifiers. In some implementations, an identifier can be assigned to one or more aspects of a conveyor pattern. For example, a first pattern may currently be visible on a conveyor belt and a second pattern having a spatial relationship with the first pattern may not currently be visible due to the second pattern being covered by the product. Such a state (first pattern visible while second pattern is not visible) can be assigned a unique identifier. Using that unique identifier, the exact current location of the product can be defined so that the product can be localized and thereby identified.

Examples herein refer to images and/or image sensing. An image can be captured using any suitable optical equipment by way of, for example, visible light, infrared light, and/or ultraviolet light. An image sensor can include, or be included within, a camera, a charge-coupled device, and/or another optical detector capable of registering light. An image can be captured based on light reflected by a pattern, or light transmitted by a pattern, or combinations thereof. Capturing an image of a thing can include capturing an image of only part of the thing. That is, an image of a thing does not necessarily show the thing in its entirety. An image can be captured at any resolution that allows detection of a pattern. For example, such detection can include that a system distinguishes a pattern from other image content, such image content including, but not limited to, another (non-patterned) surface area of a conveyor belt and/or noise.

Examples herein refer to tracking and/or tracing one or more products back to at least one earlier product in a different state of separation and/or state of assembly and/or mode of transportation. In some implementations, essentially all portions of an animal carcass can be tracked or traced, in the meat processing plant, to the original animal and/or to another portion of the same animal. For example, tracking or tracing can involve identifying substantially all pieces of organic matter that originated with a specific animal.

FIG. 1 shows an example of a system 100 that facilitates traceability of a product. The system 100 can be used with one or more other examples described herein. For example, the conveyor 200 in FIG. 2A can be included in the system 100. For example, the conveyor belt 300 in FIG. 3, the conveyor belt 400 in FIG. 4, the conveyor belt 500 in FIG. 5, the conveyor belt 600 in FIG. 6, and/or the conveyor belt 700 in FIG. 7, can be included in the system 100. As another example, one or more carrier patterns and/or conveyor patterns in FIG. 8 and/or in FIG. 9 can be used with the system 100. As another example, the method 1000 in FIG. 10 and/or the method 1100 in FIG. 11 can be performed using, or by, the system 100. Some aspects of the system 100 are schematically illustrated for clarity, and only portions of the system 100 are shown for simplicity. In some implementations, the system 100 can include one or more other components or stages that are not illustrated here.

The system 100 includes a preceding station 102. The preceding station 102 is here schematically illustrated as a region delineated by a dashed outline. The preceding station 102 represents one or more stages, processing operations, and/or preparatory steps taking place before subsequent operations in the system 100. The preceding station 102 involves one or more products that will be subject to further manufacturing operations (e.g., separation and/or assembly and/or transportation) within the system 100. The preceding station 102 is shown to include products 104, here illustrated as products 104-1, 104-2, . . . , 104-N, respectively, where N is a positive integer greater than two. The products 104 can be identical to each other, or two or more of the products 104 can be different from each other. Each of the products 104 can be associated with a corresponding one of carriers 106, here illustrated as carriers 106-1, 106-2, . . . , 106-N, respectively, where N is a positive integer greater than two. Each of the carriers 106 can include structure designed to support a corresponding one of the products 104, including, but not limited to, by the product 104 hanging from the carrier 106, or by the product 104 resting on or within the carrier 106. The carriers 106 can be identical to each other, or two or more of the carriers 106 can be different from each other. Each of the carriers 106 can be associated with a corresponding one of patterns 108, here illustrated as patterns 108-1, 108-2, . . . , 108-N, respectively, where N is a positive integer greater than two. Each of the patterns 108 can include a pattern that identifies a corresponding one of the products 104. The patterns 108 can be of the same type as each other, or two or more of the patterns 108 can be of different types. One or more of the patterns 108 can be referred to as a carrier pattern due to being associated with (e.g., affixed to) the corresponding carrier 106.

In some implementations, the system 100 is operated in a meat processing plant. For example, each of the products 104 can be a carcass of a respective animal, wherein the preceding station 102 serves to perform one or more operations that prepare the carcasses for subsequent stages of the meat processing plant. In some implementations, each of the carriers 106 can be a meat hook configured to hold meat, the meat hook attached to a trolley configured to move along an overhead track in the meat processing plant.

In some implementations, the system 100 is operated in an assembly plant. For example, each of the products 104 can be a sub-component of a component, a component of an apparatus, an apparatus, and/or a system including the apparatus, wherein the preceding station 102 serves to perform one or more operations that prepare the products 104 for subsequent stages of the assembly plant.

Each of the carriers 106 is uniquely associated with the corresponding one of the products 104 by way of the product 104 being carried only by that one of the carriers 106. As a result, one or more of the patterns 108 that is affixed to the carrier 106 can therefore become uniquely associated with the corresponding one of the products 104 (at least during a certain period of time). That is, as long as the products 104 are associated with their respective ones of the carriers 106, this association may be sufficient for tracking purposes, and a computer system (not shown) can maintain information corresponding to the respective patterns 108. At some point during the processing in the system 100, however, it may become necessary or practical to no longer have a physical structure (e.g., a tag carrying a marker) carrying the identification of the corresponding pattern 108. As such, a method performed by, or using, the system 100 can include registering a carrier pattern. In some implementations, one or more of the patterns 108 can be registered as part of performing the method. For example, the registration of the carrier pattern can be done based on detection of the carrier pattern at a carrier (e.g., one of the carriers 106) that holds the product. Such a carrier pattern can be associated with the identification of a product, for example as will be described below.

The system 100 can include one or more conveyors 110 (e.g., belt conveyors), here illustrated as conveyors 110-1, 110-2, . . . , 110-M, respectively, where M is a positive integer greater than two. The conveyors 110 can be identical to each other, or two or more of the conveyors 110 can be different from each other. One or more of the conveyors 110 can include a conveyor belt fitted onto multiple pulleys and running as an endless loop. For example, a conveyor belt can be made of a flexible medium and/or of segments hinged to each other, and can be wrapped around two or more drums while also being supported by one or more smooth surfaces. The conveyor belt can be advanced in either or both directions by way of one or more motors. For example, one or more pulleys can be driven to advance the conveyor belt. In this example, each of the conveyors 110 can be configured to advance the products 104 in a direction away from the preceding station 102 (e.g., toward the right in the present illustration). As such, the conveyor belts of the conveyors 110 can be driven (continuously or intermittently) in a clockwise direction in the present example. Each of the conveyor belts of the conveyors 110 can be provided with patterns that can be used for identification of the products 104, for example as will be described below.

The system 100 can include one or more image sensors 112, here illustrated as image sensors 112-1, 112-2, . . . , 112-M respectively, where M is a positive integer greater than two. The image sensors 112 can be identical to each other, or two or more of the image sensors 112 can be different from each other. Each of the conveyors 110 can have at least one of the image sensors 112 associated therewith. There can be at least as many of the image sensors 112 as the number of the conveyors 110. In some implementations, one or more of the conveyors 110 can have at least two of the image sensors 112. The image sensors 112 are configured to capture an image of at least part of the conveyor belt of the corresponding one of the conveyors 110.

One or more of the products 104 can be placed on the conveyors 110 to transport the product(s) 104 from the preceding station 102 to one or more subsequent stages handled by the system 100. In some implementations, at the beginning of such transportation the product 104-1 is placed on the conveyor belt of the conveyor 110-1. Once positioned, the product 104-1 will cover one or more patterns at the conveyor belt, whereas one or more other patterns of the conveyor belt will remain visible adjacent the product 104-1. As such, the image sensor 112-1 can capture an image of the conveyor belt of the conveyor 110-1 while the product 104-1 is positioned on that conveyor belt. The particular position of the product 104-1 on the conveyor belt—covering at least one pattern and not covering at least one other pattern—can be said to uniquely identify the product 104-1 as long as it remains in the same, or approximately the same, position on the conveyor belt. As such, the product 104-1 can be identified while on the conveyor belt of the conveyor 110-1 by way of processing (e.g., analyzing) the image captured by the image sensor 112-1. That is, the identification can be done based at least in part on knowing a particular carrier pattern (e.g., the pattern 108-1) associated with a carrier that at some point held the product 104-1. The pattern 108-1 is registered (e.g., scanned or otherwise detected) before the product 104-1 is placed on the conveyor belt.

The product 104-1 that is placed on the conveyor belt of the conveyor 110-1 can be transported onto one or more of the conveyors 110-2 through 110-M as part of the processing in the system 100. Likewise, the products 104-2 through 104-N can in turn be placed on the conveyor belt of the conveyor 110-1 and can be transported onto one or more of the conveyors 110-2 through 110-M as part of the processing in the system 100.

The system 100 can include one or more stations where at least one operation can be performed on, or otherwise applied to, the product after it arrives. Such operations can involve inspection of the product, treatment of the product, separation of the product into two or more products, and/or assembly of two or more products into a new product, and/or combinations thereof. Here, the system 100 has a station 114 that is positioned along the conveyor 110-1, and a station 116 that is positioned at one end of the conveyor 110-1. Each of the stations 114 and 116 is here schematically illustrated as a region delineated by a dashed outline, and represents one or more stages, processing operations, and/or steps taking place before subsequent operations in the system 100. For example, the product 104-1 can enter the station 114 after being transported by the conveyor belt less than the entire length of the conveyor 110-1. As another example, the product 104-1 (or part thereof, or an assembly including the product 104-1) can enter the station 116 after being transported by the conveyor belt the entire length of the conveyor 110-1. The event of the product 104-1 disappearing from the conveyor 110-1 at the station 114 or 116 can be referred to as a detection of a station entry by the system 100. For example, station entry occurs automatically or by way of intervention by a human operator.

A product can enter one of the conveyors 110 at any of the stations 114 or 116. In some implementations, the product 104-1 can be separated (e.g., divided) into at least two products at either of the stations 114 or 116. For example, the product 104-1 can be meat, and the meat can be separated into at least one meat product. As such, one or more of the at least two resulting products can enter the conveyor 110-1 at the station 114, or can enter the conveyor 110-2 at the station 116, as the case may be. As another example, the product 104-1 can be assembled (e.g., combined) with at least one other product at either of the stations 114 or 116. As such, the resulting product can enter the conveyor 110-1 at the station 114, or can enter the conveyor 110-2 at the station 116, as the case may be. Such resulting product(s) can be subjected to identification essentially in the same way as for the product 104-1. In some implementations, the image sensor 112-1 (or another of the image sensors 112 associated with the conveyor 110-1) can capture an image of the conveyor belt of the conveyor 110-1 while the resulting product(s) is/are positioned on that conveyor belt. In some implementations, the image sensor 112-2 associated with the conveyor 110-2 can capture an image of the conveyor belt of the conveyor 110-2 while the resulting product(s) is/are positioned on that conveyor belt. The particular position(s) of the resulting product(s) on the conveyor belt—covering at least one pattern and not covering at least one other pattern—can be said to uniquely identify the resulting product(s) on the conveyor belt. As such, the transition from one product whose identity is known due to recognition of a pattern on the conveyor belt into the resulting product(s) can be leveraged into an identification of the resulting product(s) by way of recognition of a (possibly) different pattern on the same or another conveyor belt. In short, a product can disappear from the conveyor at a particular station and a station entry can be detected by the system; upon the same or a different product then entering the conveyor at the particular station the system can associate this with the product that was subject to the station entry. For example, if a relatively larger piece of meat enters a station from a conveyor belt and the next event detected by the system is that one or more products enter the conveyor belt at the station, the system can associate the identities of the incoming and outgoing products with each other. In this way, the system can maintain tracking and/or traceability between two or more products across the processing that takes place at one or more stations.

The system 100 can include a packaging station 118. The packaging station 118 is here schematically illustrated as a region delineated by a dashed outline, and represents one or more stages, processing operations, and/or steps taking place before subsequent operations. In some implementations, products that have been processed in the system 100—e.g., by being transported by one or more of the conveyors 110—can be packaged for further transportation at the packaging station 118. The packaging station 118 is shown to include products 120, here illustrated as products 120-1, 120-2, . . . , 120-P, respectively, where P is a positive integer greater than two. The products 120 can be identical to each other or two or more of the products 120 can be different from each other. Each of the products 104 can be associated with a corresponding one of patterns 122, here illustrated as patterns 122-1, 122-2, . . . , 122-P, respectively, where P is a positive integer greater than two. Each of the patterns 122 can include a pattern that identifies a corresponding one of the products 120. The patterns 122 can be of the same type as each other, or two or more of the patterns 122 can be of different types. One or more of the patterns 122 can be referred to as a package pattern due to being associated with (e.g., affixed to) the corresponding product 120 during packaging. The packaging station 118 can include at least one image sensor 124 that can capture an image of at least one of the patterns 122 and thereby identify the corresponding one of the products 120. Note that the products 104 at the preceding station 102 are uniquely associated with the patterns 108 by way of being carried by respective ones of the carriers 106, and that the products 120 at the packaging station 118 are likewise uniquely associated with the patterns 122 by way of the patterns 122 being individually associated with (e.g., affixed to) the products 120. During transportation by the conveyors 110, by contrast, such an immediate and physical association between a product and a pattern may not exist. For example, in the transportation by the conveyors 110, it may not be practical or possible or desirable to use patterns that are affixed, or otherwise directly applied, to the products. Rather, the identification of the products during transportation by the conveyors 110 can be done by way of recognizing the pattern(s) visible adjacent the product, and the pattern(s) covered by the product, as it sits on the conveyor belt, for example as described elsewhere herein.

Figure 2A:
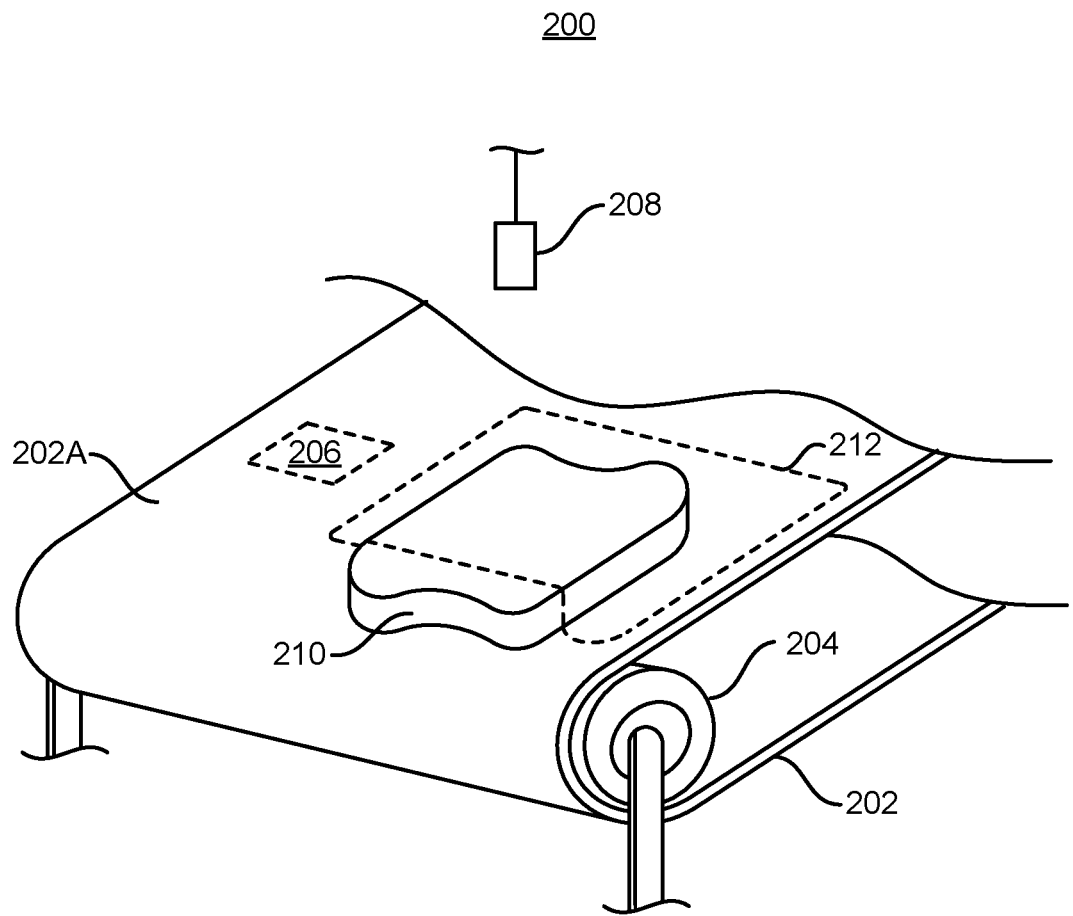
FIG. 2A shows a portion of a conveyor that can be used in manufacturing a product and that facilitates traceability of the product.

FIG. 2A shows a portion of a conveyor 200 that can be used in manufacturing a product and that facilitates traceability of the product. The conveyor 200 can be used with one or more other examples described herein. Some aspects of the conveyor 200 are schematically illustrated for clarity, and only portions of the conveyor 200 are shown for simplicity. In some implementations, the conveyor 200 can include one or more other components or stages that are not illustrated here.

The conveyor 200 includes a conveyor belt 202 running against at least one pulley 204. A surface 202A of the conveyor belt 202 (e.g., an outwardly facing surface) is provided with a conveyor pattern 206 that is visible to an image sensor 208. The conveyor pattern 206 is here schematically illustrated as the dashed outline of a polygon, and extends over some or all of the surface 202A. The conveyor pattern 206 includes at least two patterns (e.g., as described below). A product 210 is currently located on the surface 202A of the conveyor belt 202. The image sensor 208 can capture one or more images corresponding to a field of view 212. At a time of imaging, the field of view 212 can include the entirety of the product 210, or a portion of the product 210. At a time of imaging, the field of view 212 covers at least part of the conveyor pattern 206 on the surface 202A. For example, the field of view 212 can include at least one pattern that is part of the conveyor pattern 206, whereas another part of the conveyor pattern 206 is not visible to the image sensor 208 due to being covered by the product 210. As such, the product 210 can be uniquely identified based at least in part on information captured by the image sensor 208 in the field of view 212. In some implementations, the product 210 includes meat. In some implementations, the product 210 includes a meat portion obtained from another product. In some implementations, the product 210 includes a product other than organic matter. For example, the product 210 can include mineral, metal, and/or a chemical compound (e.g., polymers, including, but not limited to, plastic).

Figure 2B:
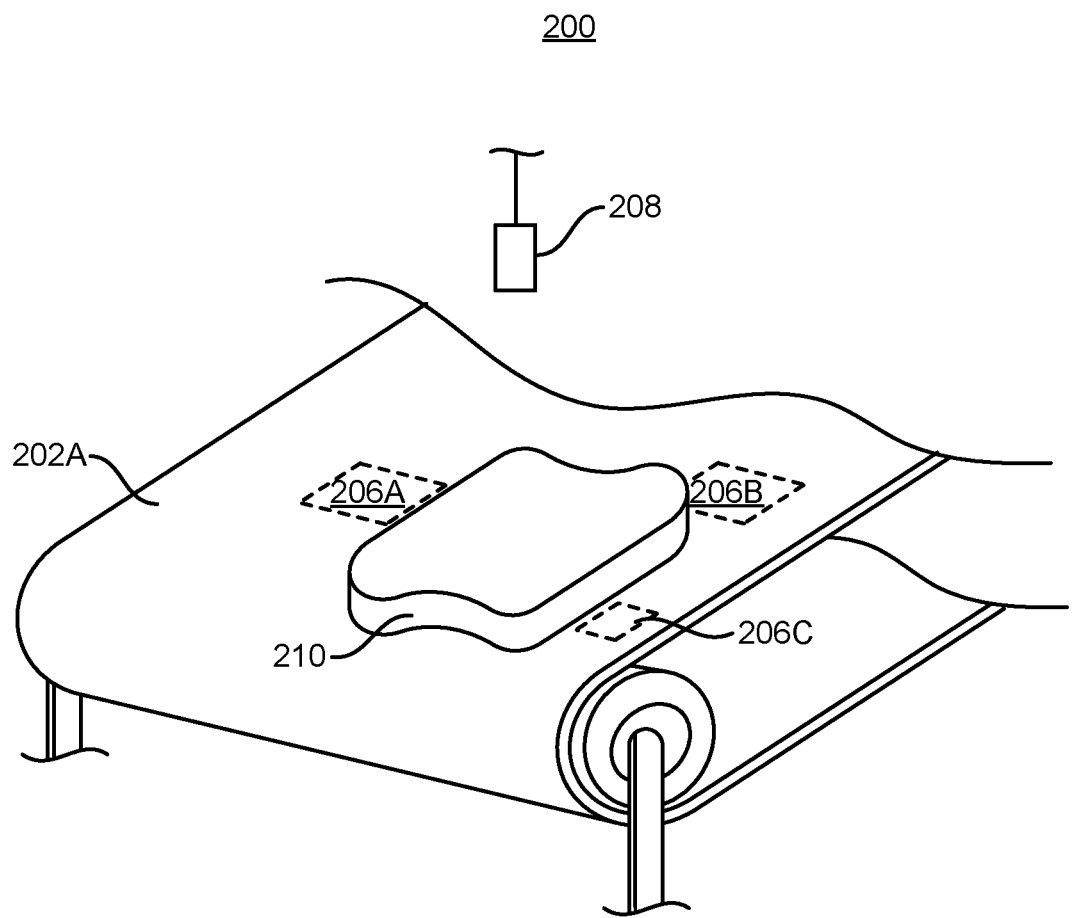
FIG. 2B shows an example involving the conveyor in FIG. 2A.

FIG. 2B shows an example involving the conveyor 200 in FIG. 2A. Here, conveyor patterns 206A, 206B, and 206C are positioned at a periphery of the product 210. The conveyor patterns 206A, 206B, and 206C can be distributed randomly on the surface 202A. As such, the system can identify the product 210 based on at least one of the conveyor patterns 206A, 206B, and 206C.

Figure 2C:
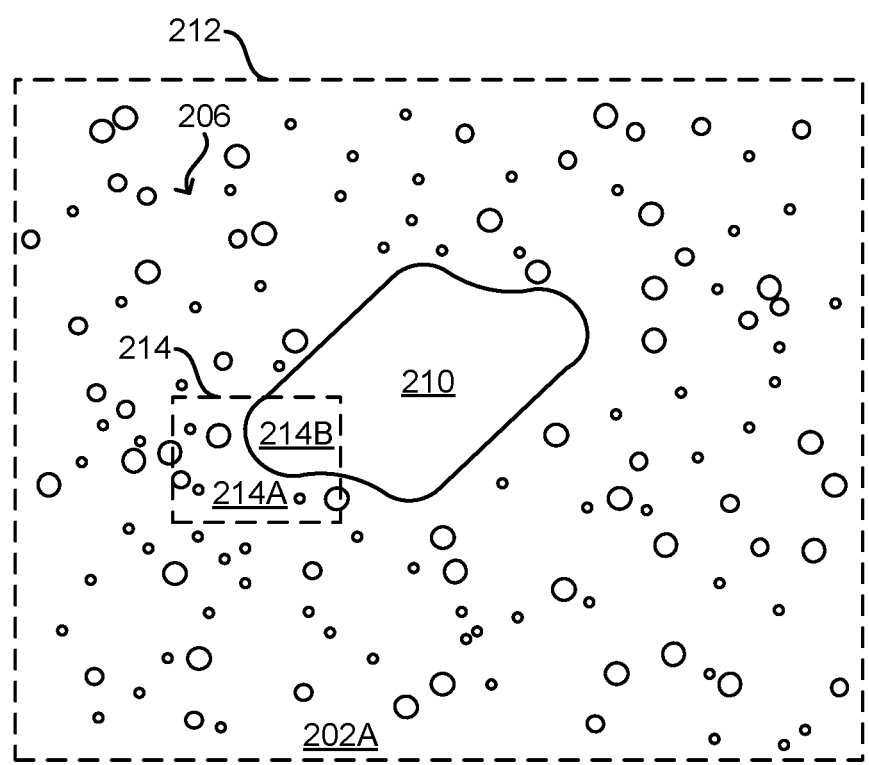
FIG. 2C shows another example involving the conveyor in FIG. 2A.

FIG. 2C shows another example involving the conveyor 200 in FIG. 2A. The product 210 and some of the conveyor pattern 206 are visible inside the field of view 212. The product 210 is presently covering some of the conveyor pattern 206. Particularly, an area 214 within the field of view 212 is here indicated as a rectangle having a dashed outline. The area 214 includes a portion 214A that is outside of the product 210, and a portion 214B that is within (that is, covered by) the product 210. The portion 214A can be located adjacent the periphery of the product 210 on the outside thereof, and the portion 214B can be located adjacent the periphery of the product 210 on the inside thereof. The parts of the conveyor pattern 206 that are within the portion 214A are currently visible to the image detector, and the parts of the conveyor pattern 206 that are within the portion 214B are currently not visible to the image detector due to being covered by the product 210.

The content of at least some of the field of view 212 can be analyzed to identify the product 210. In some implementations, the area 214 can be analyzed. For example, based on the image detector detecting the portion 214A, and not detecting the portion 214B, the product 210 can be identified. That is, the "negative space" or "hidden pattern" corresponding to the portion 214B can be the basis for one or more identifications relating to the product 210.

Figure 3:
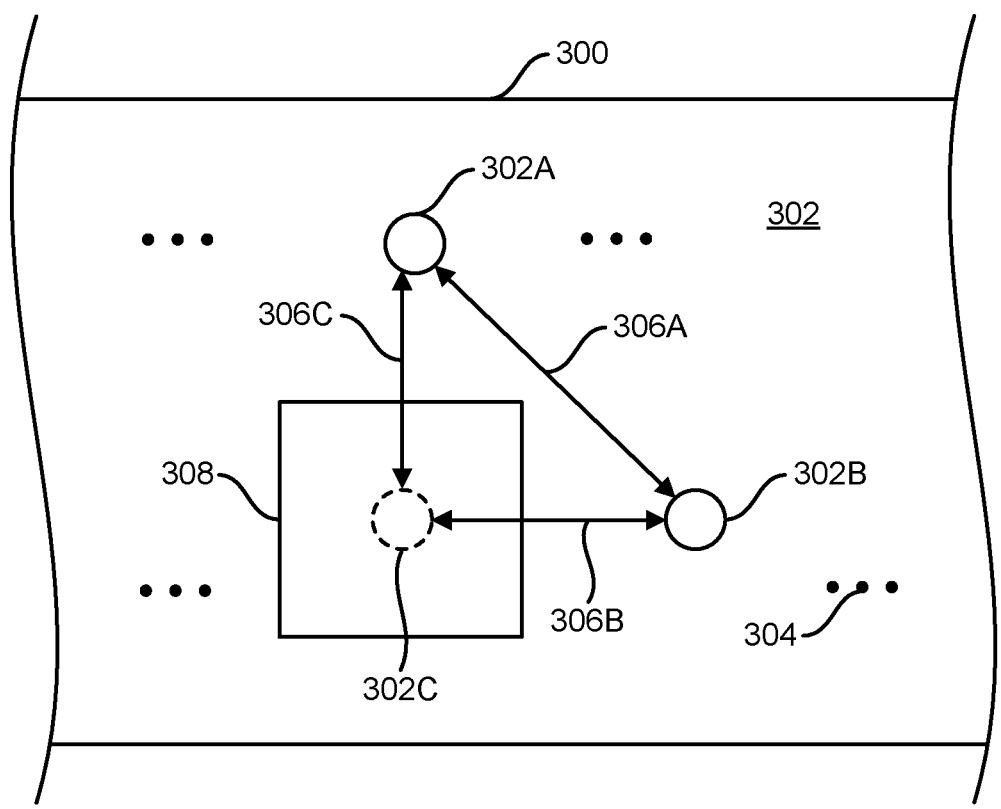
FIGS. 3-7 schematically show examples of conveyor patterns at a conveyor belt.

FIGS. 3-7 schematically show examples of conveyor patterns at a conveyor belt. FIG. 3 shows a conveyor belt 300 and patterns 302. The conveyor belt 300 and/or patterns 302 can be used with one or more other examples described herein. Some aspects of the conveyor belt 300 and/or patterns 302 are schematically illustrated for clarity, and only portions of the conveyor belt 300 and/or patterns 302 are shown for simplicity. In some implementations, the conveyor belt 300 can include one or more other components or stages that are not illustrated here.

Here, the patterns 302 are provided at a surface of the conveyor belt 300 (e.g., at an outward surface thereof) and include a pattern 302A, a pattern 302B, and a pattern 302C. The patterns 302A-302C can have the same shape as each other or can have different shapes. Here, each of the patterns 302A-302C is schematically illustrated in form of a circle. The patterns 302 on the conveyor belt 300 include more patterns in addition to the patterns 302A-302C, as schematically indicated by ellipses 304. One or more of the patterns 302 can be referred to as a conveyor pattern due to being associated with (e.g., affixed to) the conveyor belt 300.

The patterns 302 include that each of the patterns 302A-302C has a spatial relationship with one or more other ones of the patterns 302A-302C. Here, the pattern 302A and the pattern 302B have a spatial relationship 306A with each other; the pattern 302B and the pattern 302C have a spatial relationship 306B with each other; and the pattern 302A and the pattern 302C have a spatial relationship 306C with each other. A spatial relationship can involve one or more aspects relating to the relative positions of two or more patterns. In some implementations, a distance between two or more patterns is included in a spatial relationship. For example, the pattern 302A can be positioned a certain distance from the pattern 302B, and can be positioned at a (same or different) distance from the pattern 302C. In some implementations, a direction between two or more patterns is included in a spatial relationship. For example, the pattern 302A can be positioned in one direction relative to the pattern 302B, and can be positioned in another direction relative to the pattern 302C. Here, the pattern 302B can be characterized as being positioned southeast of the pattern 302A, and the pattern 302C can be characterized as being positioned south of the pattern 302A.

A product 308 is positioned on the conveyor belt 300 and is here schematically illustrated as a rectangle, although the product 308 can have any other (regular or irregular) shape. The product 308 currently covers the pattern 302C but does not currently cover either of the patterns 302A-302B. As such, when an image sensor captures an image of the conveyor belt 300 the patterns 302A-302B will be visible, and the pattern 302C will not be visible, in the image. This is here schematically illustrated by the patterns 302A-302B being drawn with solid lines, and the pattern 302C being drawn with a dashed line. A pattern tracking component (e.g., as described below) can make use of such an image of the conveyor belt 300 to uniquely identify the product 308.

Operation of the conveyor belt 300 illustrates an example of a method that can be used for tracking a product (e.g., the product 308). The method can include receiving, in a computer system, a definition of a conveyor pattern for a first conveyor belt, the conveyor pattern comprising first and second patterns having a first spatial relationship. For example, the definition of the patterns 302 can be received in a computer system (e.g., as a pattern catalog), the patterns 302 comprising the patterns 302A and 302C having the spatial relationship 306C. The method can include capturing a first image of the first conveyor belt while a first product is positioned on the first conveyor belt. For example, an image can be captured while the product 308 is positioned on the conveyor belt 300. The method can include determining, using the computer system, that the first pattern is visible in the first image and that the second pattern is not visible in the first image. For example, it can be determined that the pattern 302A is visible in the first image and that the pattern 302C is not visible in the first image. The method can include identifying, using the computer system, the first product based on the determination. For example, the computer system can associate a previous identification of the product 308 (e.g., by way of a carrier pattern or otherwise) with the fact that the product 308 is currently positioned adjacent the pattern 302A while the pattern 302C is covered and not visible. As such, the computer system can track the future transportation and/or transformation of the product 308 in a way that allows for tracing of its origin back to a state before being placed on the conveyor belt 300. Additionally, or instead, a similar identification of the product 308 can be performed based on the patterns 302B-302C.

Figure 4:
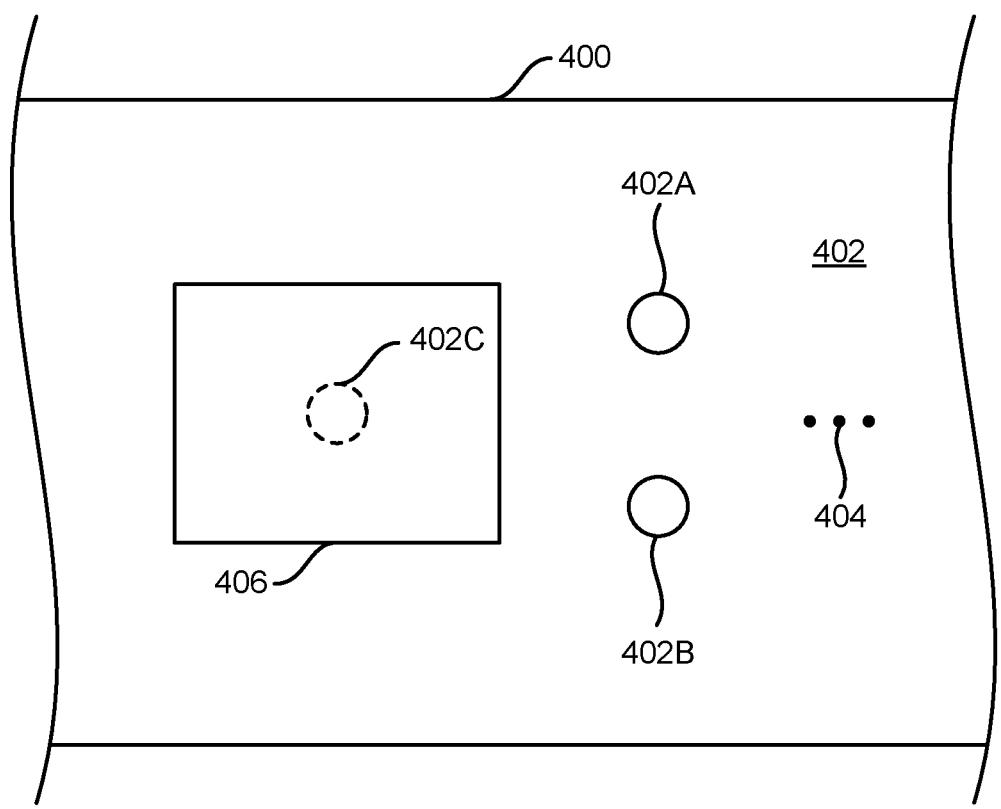

FIG. 4 shows a conveyor belt 400 and patterns 402. The conveyor belt 400 and/or patterns 402 can be used with one or more other examples described herein. Some aspects of the conveyor belt 400 and/or patterns 402 are schematically illustrated for clarity, and only portions of the conveyor belt 400 and/or patterns 402 are shown for simplicity. In some implementations, the conveyor belt 400 can include one or more other components or stages that are not illustrated here.

Here, the patterns 402 are provided at a surface of the conveyor belt 400 (e.g., at an outward surface thereof) and include a pattern 402A, a pattern 402B, and a pattern 402C. The patterns 402A-402C can have the same shape as each other or can have different shapes. Here, each of the patterns 402A-402C is schematically illustrated in form of a circle. The patterns 402 on the conveyor belt 400 include more patterns in addition to the patterns 402A-402C, as schematically indicated by ellipsis 404. One or more of the patterns 402 can be referred to as a conveyor pattern due to being associated with (e.g., affixed to) the conveyor belt 400.

The patterns 402 include that each of the patterns 402A-402C has a spatial relationship with one or more other ones of the patterns 402A-402C. A spatial relationship can involve one or more aspects relating to the relative positions of two or more patterns. In some implementations, a distance between two or more patterns is included in a spatial relationship. For example, the pattern 402A can be positioned a certain distance from the pattern 402B, and can be positioned at a (same or different) distance from the pattern 402C. In some implementations, a direction between two or more patterns is included in a spatial relationship. For example, the pattern 402A can be positioned in one direction relative to the pattern 402B, and can be positioned in another direction relative to the pattern 402C. Here, the pattern 402A can be characterized as being positioned east-northeast of the pattern 402C, and the pattern 402B can be characterized as being positioned east-southeast of the pattern 402C.

A product 406 is positioned on the conveyor belt 400 and is here schematically illustrated as a rectangle, although the product 406 can have any other (regular or irregular) shape. The product 406 currently covers the pattern 402C but does not currently cover either of the patterns 402A-402B. As such, when an image sensor captures an image of the conveyor belt 400 the patterns 402A-402B will be visible, and the pattern 402C will not be visible, in the image. This is here schematically illustrated by the patterns 402A-402B being drawn with solid lines, and the pattern 402C being drawn with a dashed line. A pattern tracking component (e.g., as described below) can make use of such an image of the conveyor belt 400 to uniquely identify the product 406.

Operation of the conveyor belt 400 illustrates an example of a method that can be used for tracking a product (e.g., the product 406). The method can include receiving, in a computer system, a definition of a conveyor pattern for a first conveyor belt, the conveyor pattern comprising first and second patterns having a first spatial relationship. For example, the definition of the patterns 402 can be received in a computer system (e.g., as a pattern catalog), the patterns 402 comprising the patterns 402A and 402C having a spatial relationship. The method can include capturing a first image of the first conveyor belt while a first product is positioned on the first conveyor belt. For example, an image can be captured while the product 406 is positioned on the conveyor belt 400. The method can include determining, using the computer system, that the first pattern is visible in the first image and that the second pattern is not visible in the first image. For example, it can be determined that the pattern 402A is visible in the first image and that the pattern 402C is not visible in the first image. The method can include identifying, using the computer system, the first product based on the determination. For example, the computer system can associate a previous identification of the product 406 (e.g., by way of a carrier pattern or otherwise) with the fact that the product 406 is currently positioned adjacent the pattern 402A while the pattern 402C is covered and not visible. As such, the computer system can track the future transportation and/or transformation of the product 406 in a way that allows for tracing of its origin back to a state before being placed on the conveyor belt 400. Additionally, or instead, a similar identification of the product 406 can be performed based on the patterns 402B-402C.

Figure 5:
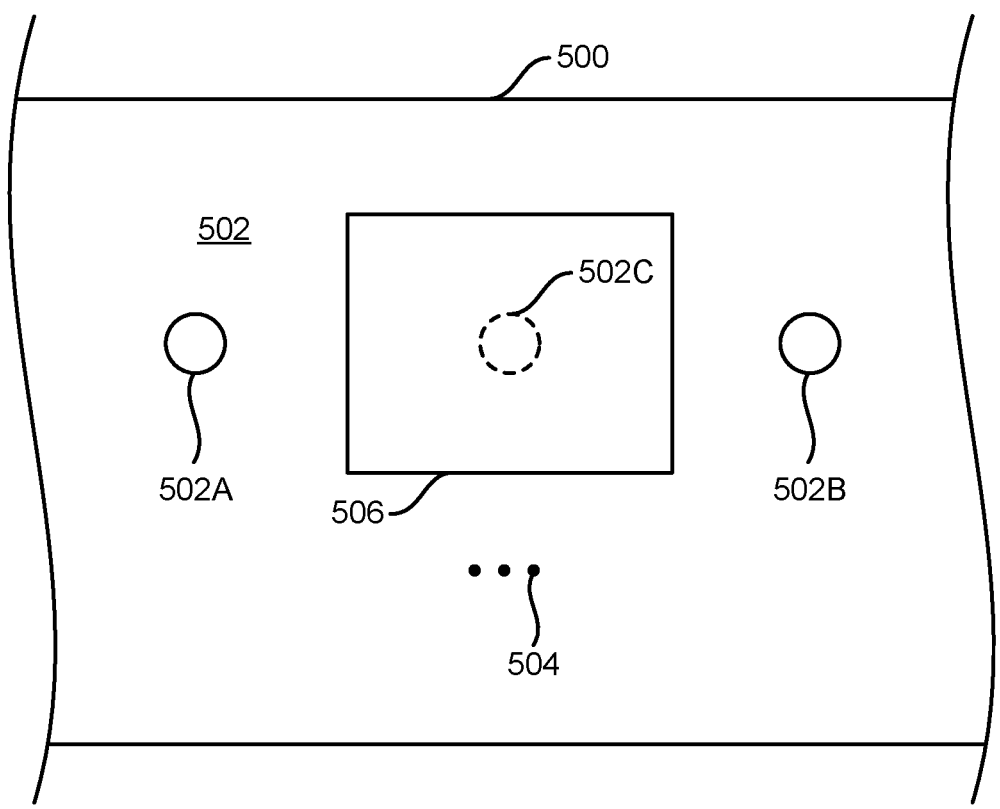

FIG. 5 shows a conveyor belt 500 and patterns 502. The conveyor belt 500 and/or patterns 502 can be used with one or more other examples described herein. Some aspects of the conveyor belt 500 and/or patterns 502 are schematically illustrated for clarity, and only portions of the conveyor belt 500 and/or patterns 502 are shown for simplicity. In some implementations, the conveyor belt 500 can include one or more other components or stages that are not illustrated here.

Here, the patterns 502 are provided at a surface of the conveyor belt 500 (e.g., at an outward surface thereof) and include a pattern 502A, a pattern 502B, and a pattern 502C. The patterns 502A-502C can have the same shape as each other or can have different shapes. Here, each of the patterns 502A-502C is schematically illustrated in form of a circle. The patterns 502 on the conveyor belt 500 include more patterns in addition to the patterns 502A-502C, as schematically indicated by ellipsis 504. One or more of the patterns 502 can be referred to as a conveyor pattern due to being associated with (e.g., affixed to) the conveyor belt 500.

The patterns 502 include that each of the patterns 502A-502C has a spatial relationship with one or more other ones of the patterns 502A-502C. A spatial relationship can involve one or more aspects relating to the relative positions of two or more patterns. In some implementations, a distance between two or more patterns is included in a spatial relationship. For example, the pattern 502A can be positioned a certain distance from the pattern 502B, and can be positioned at a (same or different) distance from the pattern 502C. In some implementations, a direction between two or more patterns is included in a spatial relationship. For example, the pattern 502A can be positioned in one direction relative to the pattern 502B, and can be positioned in another direction relative to the pattern 502C. Here, the pattern 502A can be characterized as being positioned west of the pattern 502C, and the pattern 502B can be characterized as being positioned east of the pattern 502C.

A product 506 is positioned on the conveyor belt 500 and is here schematically illustrated as a rectangle, although the product 506 can have any other (regular or irregular) shape. The product 506 currently covers the pattern 502C but does not currently cover either of the patterns 502A-502B. As such, when an image sensor captures an image of the conveyor belt 500 the patterns 502A-502B will be visible, and the pattern 502C will not be visible, in the image. This is here schematically illustrated by the patterns 502A-502B being drawn with solid lines, and the pattern 502C being drawn with a dashed line. A pattern tracking component (e.g., as described below) can make use of such an image of the conveyor belt 500 to uniquely identify the product 506.

The conveyor belt 500 illustrates an example of a method that can be used for tracking a product (e.g., the product 506). The method can include receiving, in a computer system, a definition of a conveyor pattern for a first conveyor belt, the conveyor pattern comprising first and second patterns having a first spatial relationship. For example, the definition of the patterns 502 can be received in a computer system (e.g., as a pattern catalog), the patterns 502 comprising the patterns 502A and 502C having a spatial relationship. The method can include capturing a first image of the first conveyor belt while a first product is positioned on the first conveyor belt. For example, an image can be captured while the product 506 is positioned on the conveyor belt 500. The method can include determining, using the computer system, that the first pattern is visible in the first image and that the second pattern is not visible in the first image. For example, it can be determined that the pattern 502A is visible in the first image and that the pattern 502C is not visible in the first image. The method can include identifying, using the computer system, the first product based on the determination. For example, the computer system can associate a previous identification of the product 506 (e.g., by way of a carrier pattern or otherwise) with the fact that the product 506 is currently positioned adjacent the pattern 502A while the pattern 502C is covered and not visible. As such, the computer system can track the future transportation and/or transformation of the product 506 in a way that allows for tracing of its origin back to a state before being placed on the conveyor belt 500. Additionally, or instead, a similar identification of the product 506 can be performed based on the patterns 502B-502C.

Figure 6:
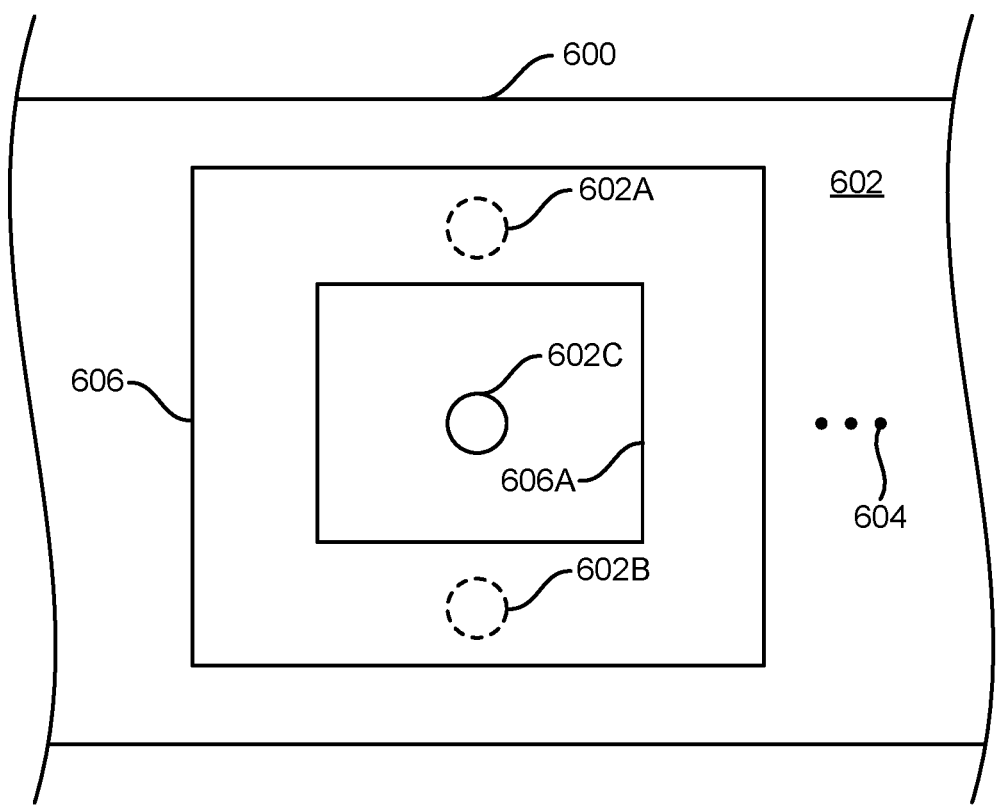

FIG. 6 shows a conveyor belt 600 and patterns 602. The conveyor belt 600 and/or patterns 602 can be used with one or more other examples described herein. Some aspects of the conveyor belt 600 and/or patterns 602 are schematically illustrated for clarity, and only portions of the conveyor belt 600 and/or patterns 602 are shown for simplicity. In some implementations, the conveyor belt 600 can include one or more other components or stages that are not illustrated here.

Here, the patterns 602 are provided at a surface of the conveyor belt 600 (e.g., at an outward surface thereof) and include a pattern 602A, a pattern 602B, and a pattern 602C. The patterns 602A-602C can have the same shape as each other or can have different shapes. Here, each of the patterns 602A-602C is schematically illustrated in form of a circle. The patterns 602 on the conveyor belt 600 include more patterns in addition to the patterns 602A-602C, as schematically indicated by ellipsis 604. One or more of the patterns 602 can be referred to as a conveyor pattern due to being associated with (e.g., affixed to) the conveyor belt 600.

The patterns 602 include that each of the patterns 602A-602C has a spatial relationship with one or more other ones of the patterns 602A-602C. A spatial relationship can involve one or more aspects relating to the relative positions of two or more patterns. In some implementations, a distance between two or more patterns is included in a spatial relationship. For example, the pattern 602A can be positioned a certain distance from the pattern 602B, and can be positioned at a (same or different) distance from the pattern 602C. In some implementations, a direction between two or more patterns is included in a spatial relationship. For example, the pattern 602A can be positioned in one direction relative to the pattern 602B, and can be positioned in another direction relative to the pattern 602C. Here, the pattern 602A can be characterized as being positioned north of the pattern 602C, and the pattern 602B can be characterized as being positioned south of the pattern 602C.

A product 606 is positioned on the conveyor belt 600 and is here schematically illustrated as a rectangle having an opening 606A, although the product 606 can have any other (regular or irregular) shape. The product 606 currently covers the patterns 602A-602B but does not currently cover the pattern 602C, which is visible through the opening 606A. As such, when an image sensor captures an image of the conveyor belt 600 the patterns 602A-602B will not be visible, and the pattern 602C will be visible, in the image. This is here schematically illustrated by the patterns 602A-602B being drawn with dashed lines, and the pattern 602C being drawn with a solid line. A pattern tracking component (e.g., as described below) can make use of such an image of the conveyor belt 600 to uniquely identify the product 606.

Operation of the conveyor belt 600 illustrates an example of a method that can be used for tracking a product (e.g., the product 606). The method can include receiving, in a computer system, a definition of a conveyor pattern for a first conveyor belt, the conveyor pattern comprising first and second patterns having a first spatial relationship. For example, the definition of the patterns 602 can be received in a computer system (e.g., as a pattern catalog), the patterns 602 comprising the patterns 602C and 602A having a spatial relationship. The method can include capturing a first image of the first conveyor belt while a first product is positioned on the first conveyor belt. For example, an image can be captured while the product 606 is positioned on the conveyor belt 600. The method can include determining, using the computer system, that the first pattern is visible in the first image and that the second pattern is not visible in the first image. For example, it can be determined that the pattern 602C is visible in the first image and that the pattern 602A is not visible in the first image. The method can include identifying, using the computer system, the first product based on the determination. For example, the computer system can associate a previous identification of the product 606 (e.g., by way of a carrier pattern or otherwise) with the fact that the product 606 is currently positioned adjacent the pattern 602C while the pattern 602A is covered and not visible. As such, the computer system can track the future transportation and/or transformation of the product 606 in a way that allows for tracing of its origin back to a state before being placed on the conveyor belt 600. The conveyor belt 600 can be used with the product 606 having the opening 606A when the pattern 602C does not occur elsewhere in the patterns 602, and/or when another of the patterns 602 (indicated by the ellipsis 604) currently visible allows the system to uniquely identify the location of the product 606. As another example, if two or more of the patterns 602 are visible in the opening 606A then the conveyor belt 600 can be used with the product 606 having the opening 606A also when the pattern 602C does occur elsewhere in the patterns 602.

Figure 7:
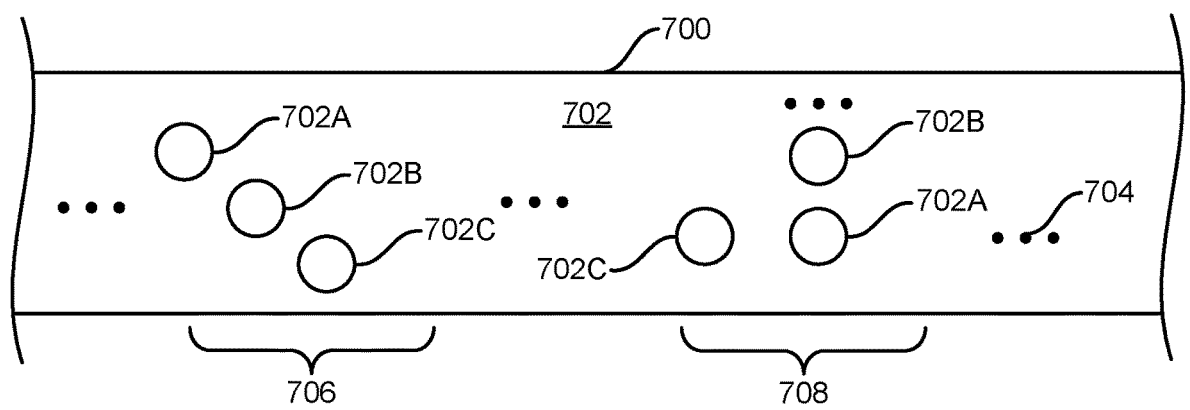

FIG. 7 shows a conveyor belt 700 and patterns 702. The conveyor belt 700 and/or patterns 702 can be used with one or more other examples described herein. Some aspects of the conveyor belt 700 and/or patterns 702 are schematically illustrated for clarity, and only portions of the conveyor belt 700 and/or patterns 702 are shown for simplicity. In some implementations, the conveyor belt 700 can include one or more other components or stages that are not illustrated here.

Here, the patterns 702 are provided at a surface of the conveyor belt 700 (e.g., at an outward surface thereof) and include a pattern 702A, a pattern 702B, and a pattern 702C. The patterns 702A-702C can have the same shape as each other or can have different shapes. Here, each of the patterns 702A-702C is schematically illustrated in form of a circle. The patterns 702 on the conveyor belt 700 include more patterns in addition to the patterns 702A-702C, as schematically indicated by ellipsis 704. One or more of the patterns 702 can be referred to as a conveyor pattern due to being associated with (e.g., affixed to) the conveyor belt 700.

One or more of the patterns 702A-702C can occur more than once at the conveyor belt 700. Here, the patterns 702 includes a grouping 706 that includes one occurrence of the patterns 702A-702C, and a grouping 708 that includes another occurrence of the patterns 702A-702C. The patterns 702 include that each of the patterns 702A-702C has a spatial relationship with one or more other ones of the patterns 702A-702C within the grouping 706 or 708. A spatial relationship can involve one or more aspects relating to the relative positions of two or more patterns. In some implementations, a distance between two or more patterns is included in a spatial relationship. For example, the pattern 702A can be positioned a certain distance from the pattern 702B, and can be positioned at a (same or different) distance from the pattern 702C, within the grouping 706 or 708. In some implementations, a direction between two or more patterns is included in a spatial relationship. For example, the pattern 702A can be positioned in one direction relative to the pattern 702B, and can be positioned in another direction relative to the pattern 702C, within the grouping 706 or 708. Here, in the grouping 706 the pattern 702A can be characterized as being positioned northwest of the pattern 702B, and the pattern 702C can be characterized as being positioned southeast of the pattern 702B. As another example, in the grouping 708 the pattern 702B can be characterized as being positioned north of the pattern 702A, and the pattern 702C can be characterized as being positioned west of the pattern 702A. The above examples illustrate that a conveyor pattern (e.g., the pattern 702) can include another occurrence of a pattern in another location on a conveyor belt (e.g., the conveyor belt 700). In some implementations, the other occurrence of the pattern does not have the same spatial relationship with another pattern. For example, the pattern 702A in the grouping 708 has another spatial relationship with the pattern 702B or the pattern 702C than the pattern 702A has in the grouping 706.

Figure 8:
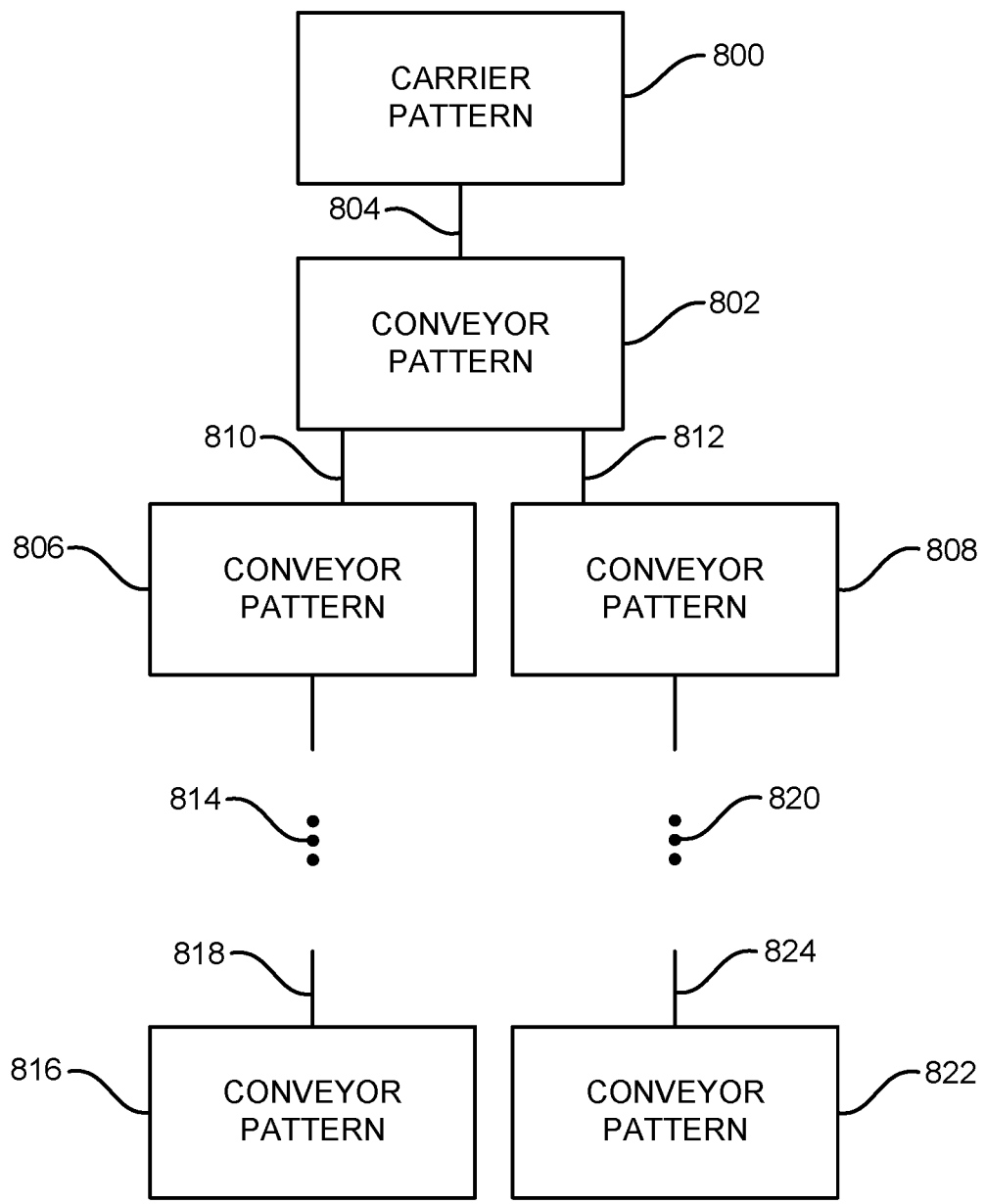
FIG. 8 schematically shows an example of associations between conveyor patterns and a carrier pattern.

During the course of a manufacturing process, or thereafter, the association between two or more patterns can be established in any of multiple different ways. FIG. 8 schematically shows an example of associations between conveyor patterns and a carrier pattern. The patterns in FIG. 8 can be used with one or more other examples described herein. A carrier pattern 800 can be associated with a product. In some implementations, with reference to FIG. 1, the pattern 108-1 can be registered in connection with the occurrence that the product 104-1 is brought onto the carrier 106-1. For example, in a meat processing plant, when a carcass (e.g., the product 104-1) is placed on a meat hook (e.g., the carrier 106-1), a computer system can associate the animal's identity (e.g., as uniquely established by an ear tag or other pattern attached to the animal) with the specific meat hook (e.g., by the pattern 108-1). Moreover, such association can result in the computer system having stored therein a unique identifier (e.g., corresponding to the carrier pattern 800) that corresponds to the product.

At one or more stages of a manufacturing process, additional identification(s) of the product, or of another product generated from the product by separation or assembly, can be performed. In some implementations, such additional identification(s) can occur by way of capturing one or more images of a pattern on a conveyor belt. For example, when the product associated with the carrier pattern 800 is removed from the carrier and placed on a conveyor belt, an image of the conveyor belt can be captured and serve as the basis for registering an identifier corresponding to a conveyor pattern 802. The carrier pattern 800 and the conveyor pattern 802 can be associated with each other by a connection 804. For example, the connection 804 identifies the carrier pattern 800 and the conveyor pattern 802 as being associated with each other.

In this example, the product enters a station where it is separated into two or more smaller products. Some or all of such smaller products can be subject to additional identification(s). In some implementations, such additional identification(s) can occur by way of capturing one or more images of a pattern on a conveyor belt. For example, when one smaller product that results from the product associated with the conveyor pattern 802 is placed on a conveyor belt (the same belt, or another belt), an image of the conveyor belt can be captured and serve as the basis for registering an identifier corresponding to a conveyor pattern 806. Similarly, when another smaller product that also results from the product associated with the conveyor pattern 802 is placed on a conveyor belt (the same belt, or another belt), an image of the conveyor belt can be captured and serve as the basis for registering an identifier corresponding to a conveyor pattern 808. The conveyor pattern 802 and the conveyor pattern 806 can be associated with each other by a connection 810. For example, the connection 810 identifies the conveyor pattern 802 and the conveyor pattern 806 as being associated with each other. The conveyor pattern 802 and the conveyor pattern 808 can be associated with each other by a connection 812. For example, the connection 812 identifies the conveyor pattern 802 and the conveyor pattern 808 as being associated with each other.

The product associated with the conveyor pattern 806 can be subject to additional identification(s) in a remainder of the manufacturing process. In some implementations, such additional identification(s) can occur by way of capturing one or more images of a pattern on a conveyor belt. Here, an ellipsis 814 schematically represents the additional identification(s), and the registration of any corresponding identifier(s). In this example, one final product of the manufacturing process is associated with an identifier corresponding to a conveyor pattern 816. The conveyor pattern 816 and a preceding pattern (not shown) can be associated with each other by a connection 818. For example, the connection 810 identifies the conveyor pattern 816 and the preceding pattern as being associated with each other. At the end of the manufacturing process, the product can be provided with a package pattern (not shown) or otherwise be uniquely labeled so that the product can identified also after removal from a conveyor belt.

The product associated with the conveyor pattern 808 can be subject to additional identification(s) in a remainder of the manufacturing process. In some implementations, such additional identification(s) can occur by way of capturing one or more images of a pattern on a conveyor belt. Here, an ellipsis 820 schematically represents the additional identification(s), and the registration of any corresponding identifier(s). In this example, another final product of the manufacturing process is associated with an identifier corresponding to a conveyor pattern 822. The conveyor pattern 822 and a preceding pattern (not shown) can be associated with each other by a connection 824. For example, the connection 824 identifies the conveyor pattern 822 and the preceding pattern as being associated with each other. At the end of the manufacturing process, the product can be provided with a package pattern (not shown) or otherwise be uniquely labeled so that the product can identified also after removal from a conveyor belt.

Some or all of the above relationships allow tracking and/or tracing to be performed. For example, if it is subsequently discovered that the original product associated with the carrier pattern 800 was defective, the computer system can find the identifiers associated with intermediary patterns, by way of the recorded connections, and determine that the products associated with the conveyor patterns 816 and 822 originate from the original product. As another example, if it is subsequently discovered that the product associated with the conveyor pattern 816 is defective, the computer system can find the identifiers associated with intermediary patterns, by way of the recorded connections, and can determine the identity of the original product and/or the identity of the product associated with the conveyor pattern 822. Tracking and/or tracing can be performed based on an original product having a desirable characteristic. In some implementations, an original animal from which meat is to be obtained can be characterized in that the animal was raised at least in part using a particular nutrient or other compound. For example, one or more types of meat can be traced back to a grass-fed animal from which the meat originated. In some implementations, an original animal from which meat is to be obtained can be characterized in that the animal was raised at least in part without using a particular nutrient or other compound. For example, one or more types of meat can be traced back to a grain-free animal from which the meat originated.

Figure 9:
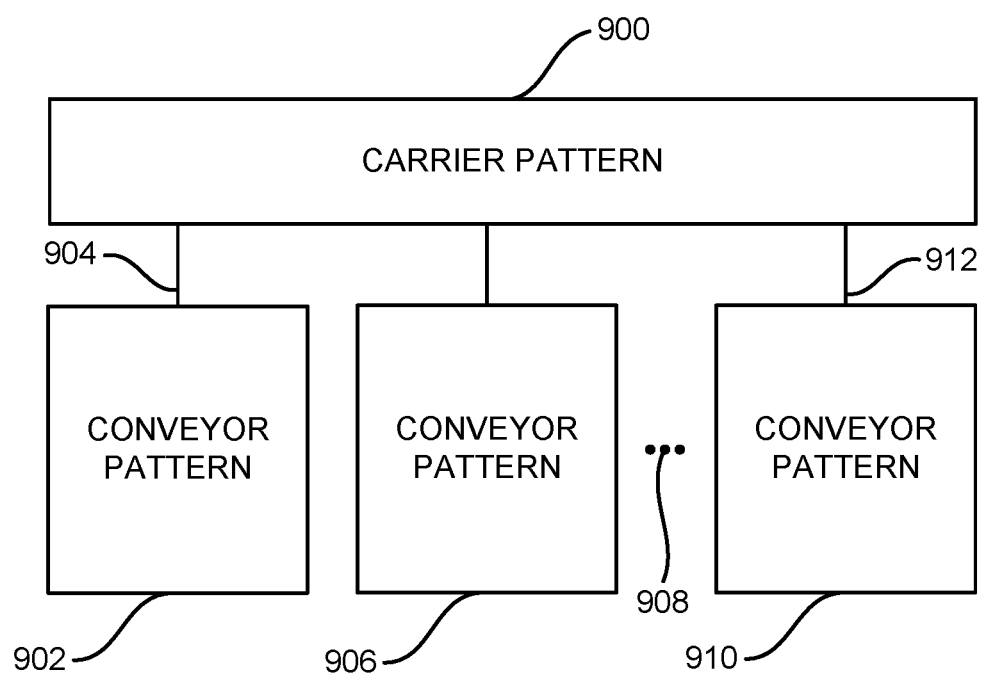
FIG. 9 schematically shows another example of associations between conveyor patterns and a carrier pattern.

The above example illustrates that a chain of associations can be established and stored in a system for possible later use in tracing the links of such chain in order to find products that are related to each other, and this approach can be used in some implementations. In other implementations, by contrast, the associations can be parsed during the course of the manufacturing process so that related products are already directly connected to each other in the stored record. FIG. 9 schematically shows another example of associations between conveyor patterns and a carrier pattern. The patterns in FIG. 9 can be used with one or more other examples described herein. A carrier pattern 900 can be associated with a product. In some implementations, with reference to FIG. 1, the pattern 108-1 can be registered in connection with the product 104-1 being brought onto the carrier 106-1. For example, in a meat processing plant, when a carcass (e.g., the product 104-1) is placed on a meat hook (e.g., the carrier 106-1), a computer system can associate the animal's identity (e.g., as uniquely established by an ear tag or other pattern attached to the animal) with the specific meat hook (e.g., by the pattern 108-1). Moreover, such association can result in the computer system having stored therein a unique identifier (e.g., corresponding to the carrier pattern 900) that corresponds to the product.

At one or more stages of a manufacturing process, additional identification(s) of the product, or of another product generated from the product by separation or assembly, can be performed. In some implementations, such additional identification(s) can occur by way of capturing one or more images of a pattern on a conveyor belt. For example, when the product associated with the carrier pattern 900 is removed from the carrier and placed on a conveyor belt, an image of the conveyor belt can be captured and serve as the basis for registering an identifier corresponding to a conveyor pattern 902. The carrier pattern 900 and the conveyor pattern 902 can be associated with each other by a connection 904. For example, the connection 904 identifies the carrier pattern 900 and the conveyor pattern 902 as being associated with each other.

The product associated with the conveyor pattern 902, or another product generated from that product by separation or assembly, can be subject to additional identification(s) in a remainder of the manufacturing process. In some implementations, such additional identification(s) can occur by way of capturing one or more images of a pattern on a conveyor belt. In some implementations, an identifier corresponding to a conveyor pattern 906 can be registered. Here, an ellipsis 908 schematically represents the additional pattern(s), and the registration of any corresponding identifier(s). In this example, one final product of the manufacturing process is associated with an identifier corresponding to a conveyor pattern 910. The carrier pattern 900 and the conveyor pattern 910 can be associated with each other by a connection 912. For example, the connection 912 identifies the carrier pattern 900 and the conveyor pattern 910 as being associated with each other. At the end of the manufacturing process, the product can be provided with a package pattern (not shown) or otherwise be uniquely labeled so that the product can be identified also after removal from a conveyor belt.

Some or all of the above relationships allow tracking and/or tracing to be performed. For example, if it is subsequently discovered that the original product associated with the carrier pattern 900 was defective, the computer system can determine that the product associated with the conveyor pattern 910 originates from the original product by way of the connection 912. As another example, if it is subsequently discovered that the product associated with the conveyor pattern 910 is defective, the computer system can determine the identity of the original product by way of the connection 912.

Figure 10:
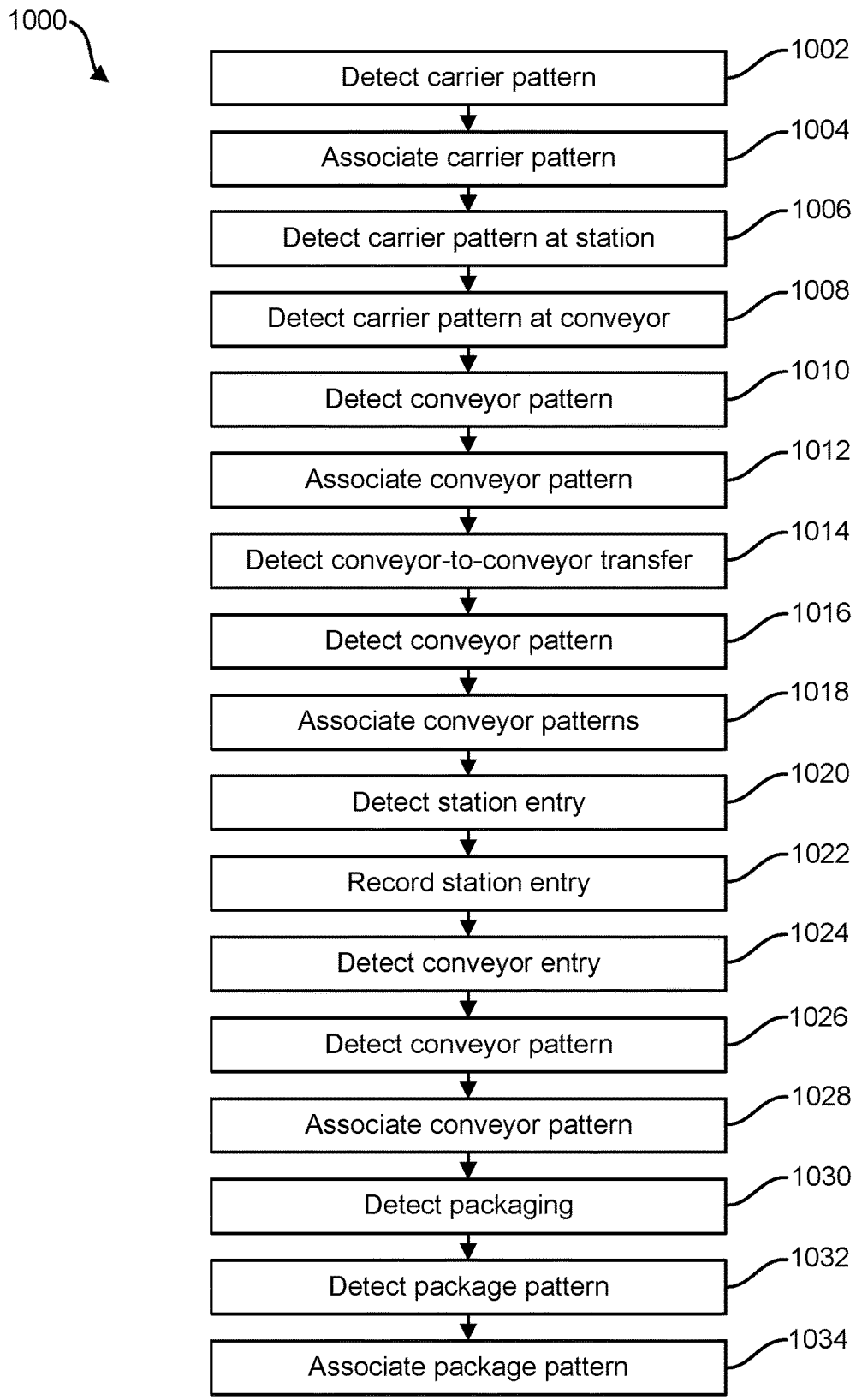
FIG. 10-11 show examples of methods.
Figure 11:
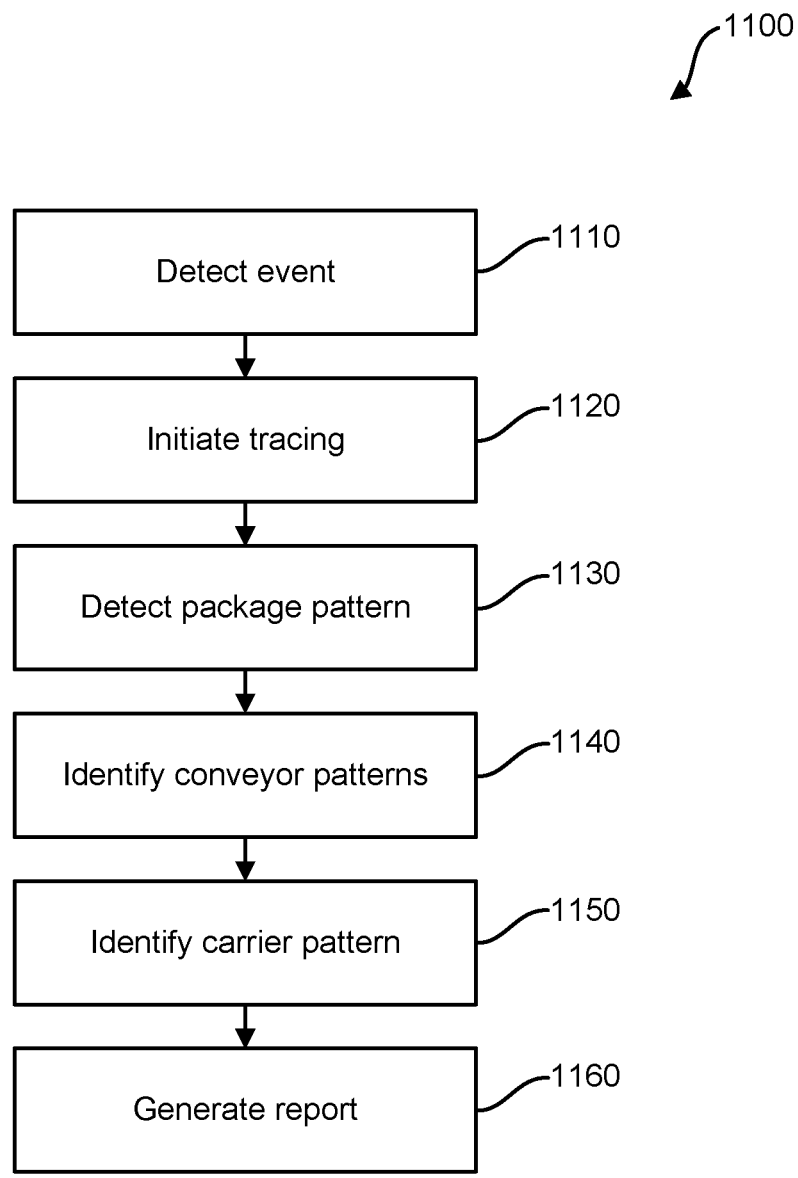

FIG. 10-11 show examples of methods 1000 and 1100. The methods 1000 and 1100 can be used with one or more other examples described herein. More or fewer operations than shown can be performed. As another example, two or more operations can be performed in a different order unless otherwise indicated.

At operation 1002, a carrier pattern can be detected. In some implementations, any of the carrier patterns 108-1 through 108-N in FIG. 1 can be detected. For example, the carrier pattern can be detected by scanning or otherwise reading the carrier pattern, and an identifier corresponding to the carrier pattern can be stored.

At operation 1004, the carrier pattern can be associated with a product. In some implementations, the registration can associate an identifier corresponding to the detected carrier pattern with another identifier for a particular product that is associated with the carrier. For example, in a meat processing plant, when a carcass is placed on a meat hanger a carrier tag of the meat hanger can be associated with a tag that is (or was) attached to the animal. That is, after the operation 1004 the computer system contains the information that a particular product is associated with a particular carrier pattern.

At operation 1006, the carrier pattern can be detected at a station. In some implementations, any of the carrier patterns 108-1 through 108-N in FIG. 1 can be detected at the preceding station 102. For example, the detection can be triggered by the occurrence that the carrier is the next one to have its product (or part thereof) be placed on the conveyor 110-1 in FIG. 1.

At operation 1008, a carrier pattern can be detected at a conveyor. In some implementations, any of the carrier patterns 108-1 through 108-N in FIG. 1 can be detected at the conveyor 110-1. For example, the detection can be triggered by the occurrence that the carrier is the next one to have its product (or part thereof) be placed on the conveyor 110-1 in FIG. 1.

At operation 1010, a conveyor pattern can be detected. In some implementations, the conveyor pattern is detected based on a captured image of a conveyor belt showing at least one pattern adjacent a product. For example, the detection can include a determination that a first pattern that is part of the conveyor pattern is visible, and that a second pattern that has a spatial relationship with the first pattern in the conveyor pattern is not visible (because it is covered by the product), in the image. Such determination can involve one or more processing operations according to the following pseudocode:

system captures an image
system detects a shape in the image
system recognizes the shape by determining that the shape corresponds to a pattern included in a pattern catalog
system identifies at least one other pattern that the pattern catalog defines as located at or near the recognized shape
system determines that the other pattern is not visible at or near the recognized shape in the image At operation 1012, the conveyor pattern can be associated with the carrier pattern. In some implementations, an identifier corresponding to the carrier pattern can be associated with the identifier corresponding to the conveyor pattern. For example, after the operation 1012 the computer system contains the information that the particular product positioned at the conveyor pattern is the same as (or separated or assembled from) the product associated with the carrier pattern.

At operation 1014, a conveyor-to-conveyor transfer can be detected. In some implementations, it can be detected with reference to FIG. 1 that a product is leaving the conveyor 110-1 and that a product is entering the conveyor 110-2. For example, the two products can be the same, or the latter product can be separated or assembled from the earlier product.

At operation 1016, a conveyor pattern can be detected. In some implementations, a pattern on the conveyor 110-2 in FIG. 1 can be detected based on the product being placed on that conveyor.

At operation 1018, the detected conveyor pattern can be associated with the previous conveyor pattern. In some implementations, an identifier corresponding to the conveyor pattern can be associated with the identifier corresponding to the previous conveyor pattern. For example, after the operation 1018 the computer system contains the information that the particular product positioned at the detected conveyor pattern is the same as (or separated or assembled from) the product associated with the previous conveyor pattern.

At operation 1020, a station entry can be detected. In some implementations, with reference to FIG. 1, it can be determined that a product enters the station 114 and/or the station 116. The product can enter a station in order to be subject to one or more forms of actions, including, but not limited to, being separated and/or being assembled.

At operation 1022, the station entry can be recorded. In some implementations, with reference to FIG. 1, an identifier corresponding to the station 114 or the station 116 can be associated with an identifier corresponding to the previous conveyor pattern. For example, after the operation 1022 the computer system contains the information that the particular product that was positioned at the detected conveyor pattern has entered the detected station (and may no longer be positioned on the conveyor belt).

At operation 1024, a conveyor entry can be detected. For example, the entry can be by the product that was subject to the recording in operation 1022, or by a product that was separated or assembled from that product at the station.

At operation 1026, a conveyor pattern can be detected. For example, the conveyor pattern is detected based on the product being placed at that conveyor pattern when leaving the station.

At operation 1028, the registered conveyor pattern can be associated with the previous conveyor pattern. In some implementations, an identifier corresponding to the conveyor pattern can be associated with the identifier corresponding to the previous conveyor pattern. For example, after the operation 1028 the computer system contains the information that the particular product positioned at the registered conveyor pattern is the same as (or separated or assembled from) the product associated with the previous conveyor pattern.

At operation 1030, initiation of a packaging operation can be detected. In some implementations, with reference to FIG. 1, the computer system can detect that the product 120-1 is at the packaging station 118.

At operation 1032, a package pattern can be detected. In some implementations, with reference to FIG. 1, the pattern 122-1 of the product 120-1 can be detected.

At operation 1034, the package pattern can be associated with the previous conveyor pattern. In some implementations, an identifier corresponding to the package pattern can be associated with the identifier corresponding to the previous conveyor pattern. For example, after the operation 1034 the computer system contains the information that the particular product carrying the package pattern is the same as (or separated or assembled from) the product associated with the previous conveyor pattern.

Turning now to the method 1100, at operation 1110 an event can be detected. In some implementations, the event can be the basis for tracking or tracing regarding one or more products. For example, in a meat processing plant it can be detected that an animal that was processed has an illness or is otherwise contaminated, or that a product that was processed carries contamination.

At operation 1120, a tracing or tracking can be initiated. For example, this can involve accessing records including, but not limited to, those of FIG. 8 and/or FIG. 9.

At operation 1130, a package pattern can be detected. For example, if a potential defect is found in a packaged product, a pattern on the packaging can be detected to begin tracing or tracking regarding the product.

At operation 1140, one or more conveyor patterns can be identified. In some implementations, with reference to FIG. 8, this can involve tracking back through a chain of one or more conveyor patterns. In some implementations, with reference to FIG. 9, this operation can be performed before the tracing or tracking is initiated.

At operation 1150, one or more carrier patterns can be identified. For example, with reference to FIG. 8 and/or FIG. 9, it can be determined which carrier pattern corresponds to the product for which the event was detected at the operation 1110.

At operation 1160, one or more reports can be generated based on the tracing or tracking. In some implementations, the report(s) can identify one or more products potentially affected by the event that was detected at the operation 1110. For example, one or more identifiers for the other product(s) can be presented as part of the tracing or tracking.

Figure 12:
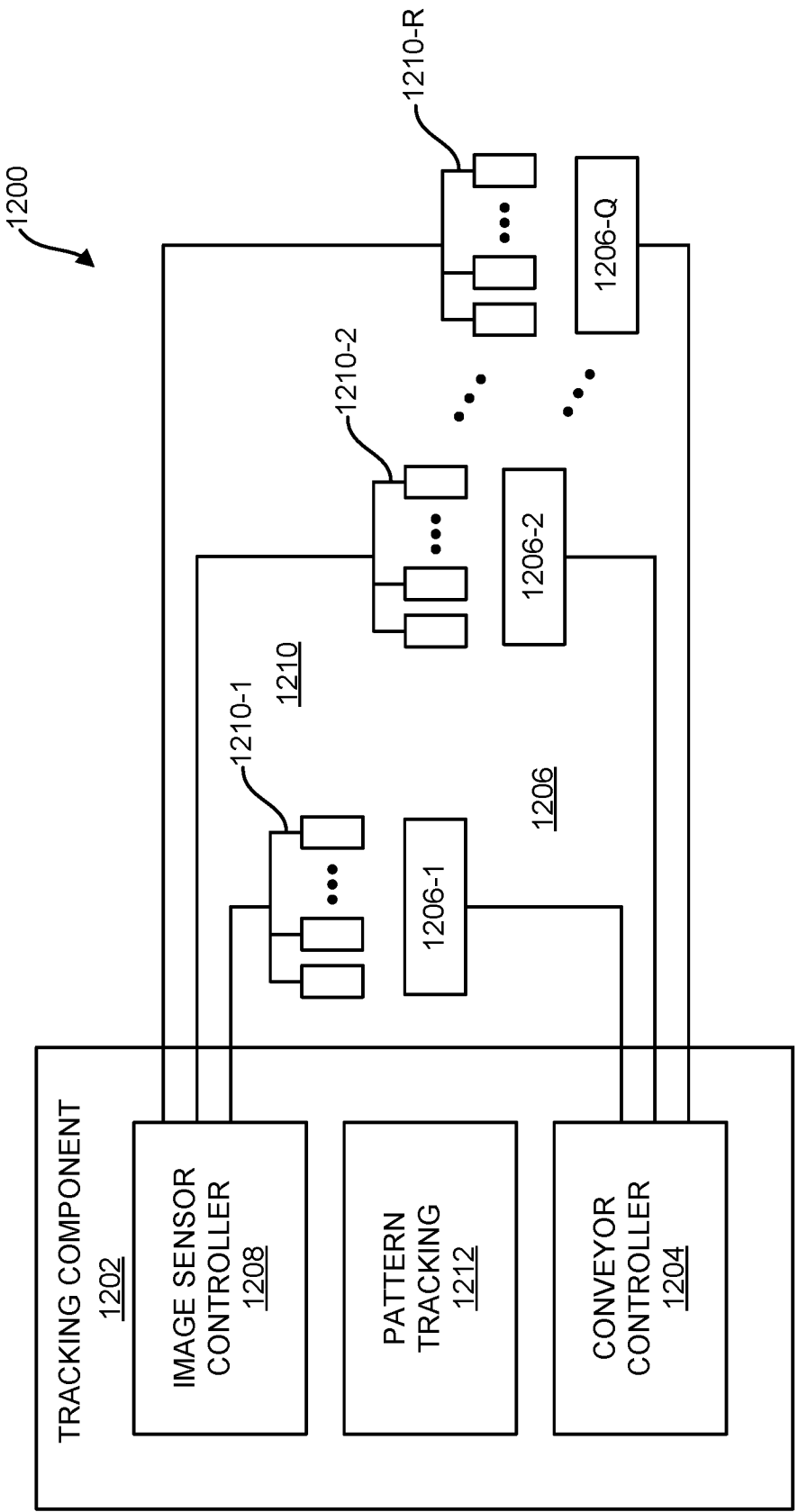
FIG. 12 schematically shows an example of a system that facilitates traceability of a product.

FIG. 12 schematically shows an example of a system 1200 that facilitates traceability of a product. The system 1200 can be used with one or more other examples described herein. For example, the conveyor 200 in FIG. 2A can be included in the system 1200. For example, the conveyor belt 300 in FIG. 3, the conveyor belt 400 in FIG. 4, the conveyor belt 500 in FIG. 5, the conveyor belt 600 in FIG. 6, and/or the conveyor belt 700 in FIG. 7, can be included in the system 1200. As another example, one or more carrier patterns and/or conveyor patterns in FIG. 8 and/or in FIG. 9 can be used with the system 1200. As another example, the method 1000 in FIG. 10 and/or the method 1100 in FIG. 11 can be performed using, or by, the system 1200.

The system 1200 includes a tracking component 1202. The tracking component 1202 can be implemented based on at least one processor executing instructions stored in a non-transitory medium. The tracking component 1202 can be used for facilitating tracing or tracking of one or more types of products.

The tracking component 1202 includes a conveyor controller 1204. The conveyor controller 1204 can be implemented based on at least one processor executing instructions stored in a non-transitory medium. The conveyor controller 1204 can be used for controlling one or more types of conveyors.

The system 1200 includes conveyors 1206, here including conveyors 1206-1, 1206-2, . . . , 1206-Q, respectively, where Q is a positive integer greater than two. The conveyors 1206 are controlled by the conveyor controller 1204.

The tracking component 1202 includes an image sensor controller 1208. The image sensor controller 1208 can be implemented based on at least one processor executing instructions stored in a non-transitory medium. The image sensor controller 1208 can be used for controlling one or more types of image sensors.

The system 1200 includes image sensors 1210, here including sets of image sensors 1210-1, 1210-2, . . . , 1210-R, respectively, where R is a positive integer greater than two. Each of the sets of image sensors 1210 can be associated with one of the conveyors 1206 and can include S number of image sensors, S being a positive integer. The sets of image sensors 1210 are controlled by the image sensor controller 1208.

The tracking component 1202 includes a pattern tracking component 1212. The pattern tracking component 1212 can be implemented based on at least one processor executing instructions stored in a non-transitory medium. The pattern tracking component 1212 can be used for tracking one or more patterns of the conveyors 1206, as detected by one or more of the sets of image sensors 1210. For example, such tracking can facilitate tracing of products also during stages where the products do not have any identifying information affixed to them (e.g., when no pattern is applied onto the product).

The system 1200 is an example of a system comprising a conveyor belt (e.g., the belt of one or more of the conveyors 1206) having a conveyor pattern (e.g., one or more of the patterns described herein), the conveyor pattern comprising first and second patterns (e.g., at least two of the patterns 302A-302C in FIG. 3) having a spatial relationship. The system comprises an image sensor (e.g., one or more of the sets of image sensors 1210) configured for capturing an image of the conveyor belt while a product is positioned on the conveyor belt. The system comprises a pattern tracking component implemented using a processor and instructions stored in a non-transitory medium (e.g., the pattern tracking component 1212). The pattern tracking component is configured to identify the product based on the first pattern (e.g., the pattern 302A) being visible in the first image and the second pattern (e.g., the pattern 302C) not being visible in the image. In some implementations, the pattern tracking component uses at least one of: a distance between the first and second patterns (e.g., the distance between the patterns 302A-302B), the distance included in the spatial relationship; or a direction between the first and second patterns (e.g., the direction between the patterns 302A-302B), the direction included in the spatial relationship.

Figure 13:
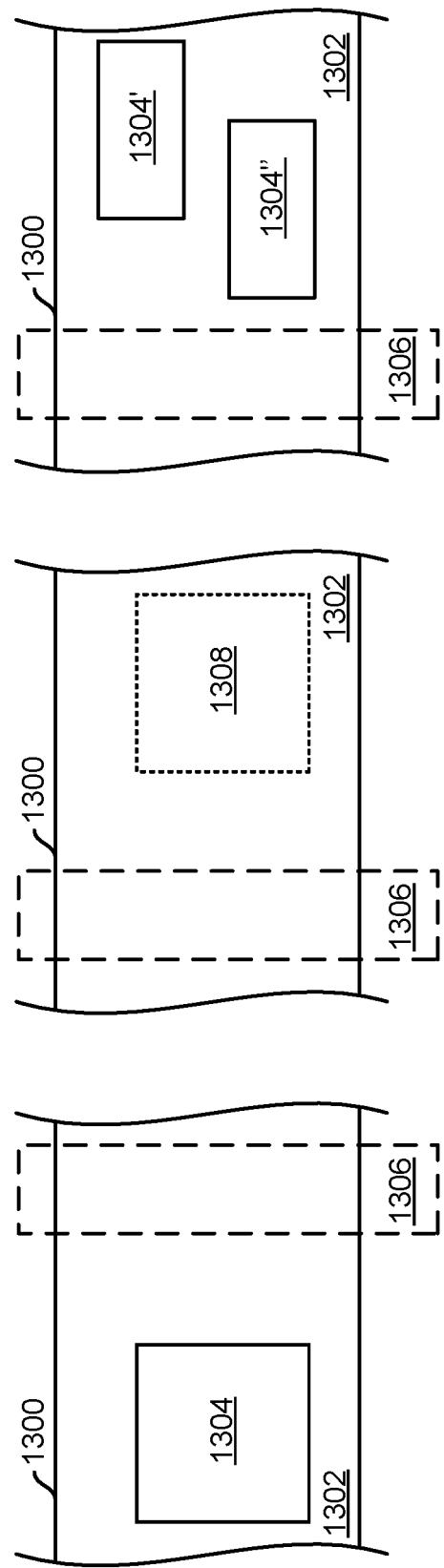
FIGS. 13A-13C show an example involving a conveyor.

FIGS. 13A-13C show an example involving a conveyor 1300. The conveyor 1300 can be used with one or more other examples described herein. For example, the conveyor 1300 can be included in the system 1200. The present example illustrates tracking when a product is separated into at least one component as part of a process.

A surface 1302 of the conveyor 1300 (e.g., an outwardly facing surface) is provided with a conveyor pattern that is visible to an image sensor. One or more products can be positioned on the surface 1302 for transportation by the conveyor 1300 to one or more locations. Here, a product 1304 is positioned on the surface 1302. The conveyor 1300 is currently being operated so that the surface 1302 and the product 1304 are traveling toward the right in the illustrated example. A station 1306 is schematically illustrated as being positioned at a portion of the conveyor 1300. The station 1306 can be situated at the side of, or at least partially intersecting with, the conveyor 1300. That is, the product 1304 is currently positioned upstream of the station 1306 in the situation exemplified in FIG. 13A. The image sensor (e.g., the image sensor(s) 1210 in FIG. 12) can capture one or more images of the conveyor pattern on the surface 1302 and establish an identification of the product 1304. For example, the product 1304 can be identified at least in part due to a recognition by the system that some portion(s) of the surface 1302 covered by the product 1304 is currently not visible.

FIG. 13B shows a portion of the conveyor 1300 located downstream (e.g., immediately after) the station 1306 in the direction of travel by the conveyor 1300. The image detector can detect, and/or the system as a whole can determine, that an area 1308 on the surface 1302 is now visible to the image detector. That is, the area 1308 is the place on the surface 1302 that earlier (e.g., in the situation shown in FIG. 13A) was covered by the product 1304 and therefore not visible to the image detector. In FIG. 13B, by contrast, the product 1304 is no longer positioned on the conveyor 1300. The detection of the area 1308 that was previously hidden can trigger one or more determinations or inferences. In some implementations, the system can formulate an assessment or a hypothesis that the product 1304 is no longer present anywhere on the conveyor 1300. For example, the assessment or hypothesis can indicate that the product 1304 was removed from the conveyor 1300 at the station 1306. Such an assessment or hypothesis can in turn be used for assessing or hypothesizing that the product 1304 is presently at the station 1306. The area 1308 can be characterized as being a formerly "negative space" or a formerly "hidden area" based on it having previously been covered from observation by the placement of the product 1304.

FIG. 13C shows approximately the same portion of the conveyor 1300 as in FIG. 13B. The image sensor(s) can detect that one or more products are positioned on the surface 1302 of the conveyor 1300. Here, a product 1304' and a product 1304" have been detected. Each of the products 1304' and 1304" can be identified by the image sensor based at least in part on the portion(s) of the conveyor pattern currently being covered. The products 1304' and 1304" may not be positioned at the area 1308 (FIG. 13B) but rather may be positioned at another portion of the conveyor 1300. The detection of the product 1304' and/or the product 1304" can trigger one or more determinations or inferences. In some implementations, the system can formulate an assessment or a hypothesis that the product 1304' and/or the product 1304" was placed on the conveyor 1300 at or near the station 1306. For example, the assessment or hypothesis can indicate that the product 1304' and/or the product 1304" came from the station 1306. Such an assessment or hypothesis can in turn be used for assessing or hypothesizing that the product 1304' and/or the product 1304" was/were previously part of the product 1304 (FIG. 13A). In some implementations, the identification of the product 1304, the subsequent detection that the product 1304 is no longer present, and the yet further subsequent detection of at least one of the products 1304' or 1304", can be the basis for a tracking operation. For example, when the product 1304 is a piece of meat that is subsequently divided into other pieces of meat including at least the products 1304' or 1304", the above example illustrates that one or more of the products 1304' or 1304" can be traced back to the product 1304. As another example, the above example illustrates that one of the products 1304' or 1304" can be traced to the other of the products 1304' and 1304". As such, tracking of the product 1304' and/or 1304" back to its original source (e.g., an animal source) can be performed.

Figure 14:
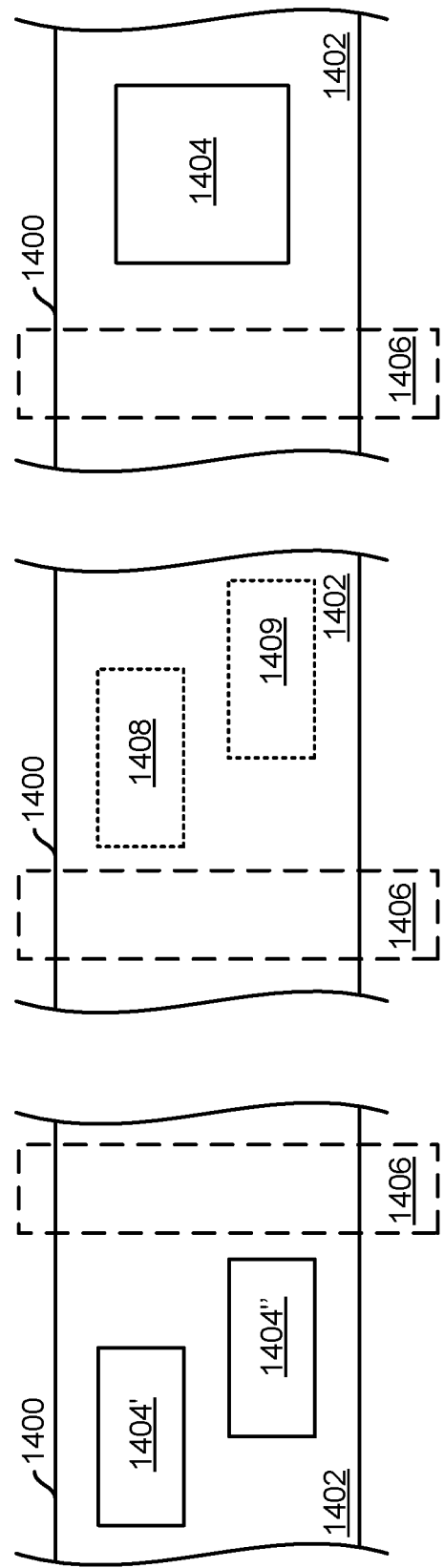
FIGS. 14A-14C show an example involving a conveyor.

FIGS. 14A-14C show an example involving a conveyor 1400. The conveyor 1400 can be used with one or more other examples described herein. For example, the conveyor 1400 can be included in the system 1200. The present example illustrates tracking when components are assembled into at least one product as part of a process.

A surface 1402 of the conveyor 1400 (e.g., an outwardly facing surface) is provided with a conveyor pattern that is visible to an image sensor. One or more products can be positioned on the surface 1402 for transportation by the conveyor 1400 to one or more locations. Here, products 1404' and 1404" are positioned on the surface 1402. The conveyor 1400 is currently being operated so that the surface 1402 and the products 1404' and 1404" are traveling toward the right in the illustrated example. A station 1406 is schematically illustrated as being positioned at a portion of the conveyor 1400. The station 1406 can be situated at the side of, or at least partially intersecting with, the conveyor 1400. That is, the products 1404' and 1404" are currently positioned upstream of the station 1406 in the situation exemplified in FIG. 14A. The image sensor (e.g., the image sensor(s) 1210 in FIG. 12) can capture one or more images of the conveyor pattern on the surface 1402 and establish an identification of the products 1404' and 1404". For example, the products 1404' and 1404" can be identified at least in part due to a recognition by the system that some portion(s) of the surface 1402 covered by the products 1404' and 1404" is currently not visible.

FIG. 14B shows a portion of the conveyor 1400 located downstream (e.g., immediately after) the station 1406 in the direction of travel by the conveyor 1400. The image detector can detect, and/or the system as a whole can determine, that an area 1408 and an area 1409 on the surface 1402 are now visible to the image detector. That is, the area 1408 is the place on the surface 1402 that earlier (e.g., in the situation shown in FIG. 14A) was covered by the product 1404' and therefore not visible to the image detector. The area 1409 is the place on the surface 1402 that earlier (e.g., in the situation shown in FIG. 14A) was covered by the product 1404" and therefore not visible to the image detector. In FIG. 14B, by contrast, the products 1404' and 1404" are no longer positioned on the conveyor 1400. The detection of the areas 1408 and 1409 that were previously hidden can trigger one or more determinations or inferences. In some implementations, the system can formulate an assessment or a hypothesis that the product 1404' and/or 1404" is/are no longer present anywhere on the conveyor 1400. For example, the assessment or hypothesis can indicate that the product 1404' and/or 1404" was/were removed from the conveyor 1400 at the station 1406. Such an assessment or hypothesis can in turn be used for assessing or hypothesizing that the product 1404' and/or 1404" is presently at the station 1406. Each of the areas 1408 and 1409 can be characterized as being a formerly "negative space" or a formerly "hidden area" based on it having previously been covered from observation by the placement of the product 1404' or 1404", respectively.

FIG. 14C shows approximately the same portion of the conveyor 1400 as in FIG. 14B. The image sensor(s) can detect that one or more products are positioned on the surface 1402 of the conveyor 1400. Here, a product 1404 has been detected. The product 1404 can be identified by the image sensor based at least in part on the portion(s) of the conveyor pattern currently being covered. The product 1404 may not be positioned at one or more of the areas 1408 and 1409 (FIG. 14B) but rather may be positioned at another portion of the conveyor 1400. The detection of the product 1404 can trigger one or more determinations or inferences. In some implementations, the system can formulate an assessment or a hypothesis that the product 1404 was placed on the conveyor 1400 at or near the station 1406. For example, the assessment or hypothesis can indicate that the product 1404 came from the station 1406. Such an assessment or hypothesis can in turn be used for assessing or hypothesizing that the product 1404 was made from, or at least in part includes, the product 1404' and/or 1404" (FIG. 14A). In some implementations, the identification of the product 1404' and/or 1404", the subsequent detection that the product 1404' and/or 1404" is no longer present, and the yet further subsequent detection of the product 1404, can be the basis for a tracking operation. For example, when the products 1404' and 1404" are sub-components that are subsequently assembled into at least the product 1404, the above example illustrates that the product 1404 can be traced back to one or more of the products 1404' or 1404". As another example, the above example illustrates that one of the products 1404' or 1404" can be traced to the other of the products 1404' and 1404". As such, tracking of the product 1404 back to its original source (e.g., an animal source) can be performed.

Figure 15:
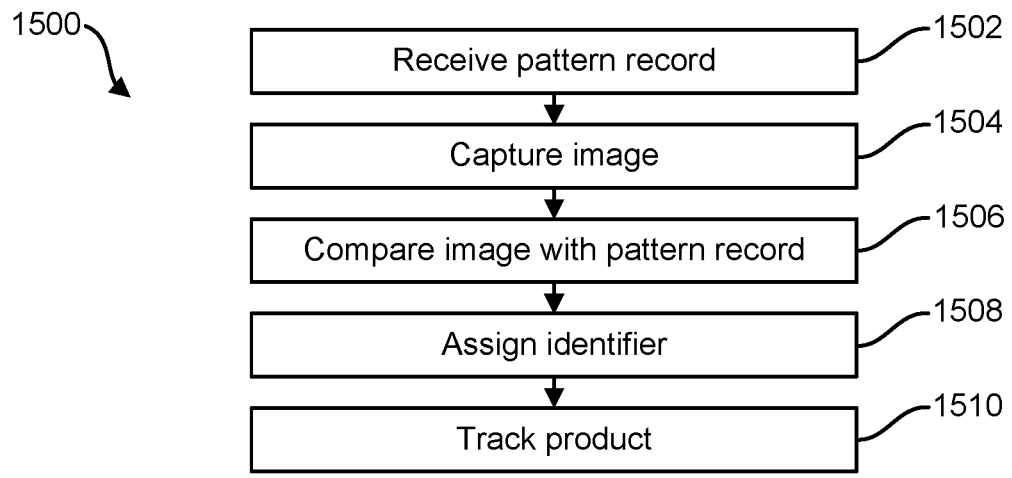
FIGS. 15 and 16 show examples of methods.
Figure 16:
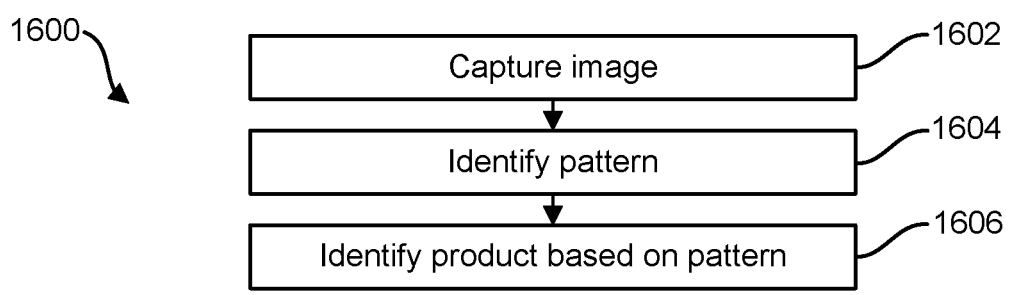

FIGS. 15 and 16 show examples of methods 1500 and 1600. The methods 1500 and 1600 can be used with one or more other examples described herein. More or fewer operations than shown can be performed. As another example, two or more operations can be performed in a different order unless otherwise indicated.

Beginning with the method 1500, at operation 1502 a pattern record can be received in a computer system. In some implementations, the pattern record corresponds to a conveyor pattern of a conveyor belt in which patterns are randomly distributed. For example, the pattern record can correspond to the conveyor pattern 206 in FIGS. 2A-2C.

At operation 1504, an image of the conveyor belt can be captured using the computer system. In some implementations, the first image is captured while a product is positioned on the conveyor belt. For example, the image can include some or all of the field of view 212 in FIGS. 2A-2C.

At operation 1506, at least part of the image can be compared with the pattern record. In some implementations, the comparison is performed to identify a corresponding portion of the pattern record for the image. For example, the portion 214A and/or the portion 214B in FIG. 2C can be identified.

At operation 1508, an identifier can be assigned to the product. In some implementations, the identifier is assigned based on the corresponding portion of the pattern record. For example, the product 210 can be associated with the portion 214B in FIG. 2C that is currently covered by the product 210.

At operation 1510, the product can be tracked using the assigned identifier. In some implementations, the product can be tracked through a station entry to another side of the station. For example, the product 1304 in FIGS. 13A-13C can be tracked to another side of the station 1306. As another example, the products 1404' and 1404" in FIGS. 14A-14C can be tracked to another side of the station 1406.

Turning now to the method 1600, at operation 1602 an image of a conveyor belt can be captured by a computer system while a product is positioned on the conveyor belt. In some implementations, the conveyor belt has a conveyor pattern in which patterns are randomly distributed. For example, the image can include some or all of the field of view 212 in FIGS. 2A-2C.

At operation 1604, a pattern of the conveyor pattern can be identified based on the image. In some implementations, the pattern can be identified as being currently covered by the product. For example, a pattern in the portion 214B in FIG. 2C can be identified based on the pattern not being visible while a pattern in the portion 214A is visible.

At operation 1606, the product can be identified based on the identified pattern. In some implementations, an identifier associated with the identified pattern can be assigned to the product. For example, the assigned identifier can be used in tracking the product.

Figure 17A:
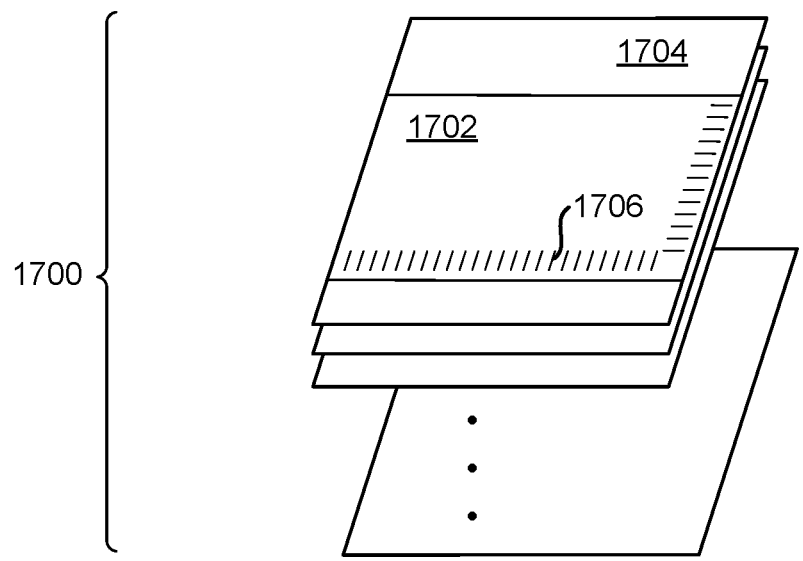
FIGS. 17A-17B schematically show an example of marking images with distances.
Figure 17B:
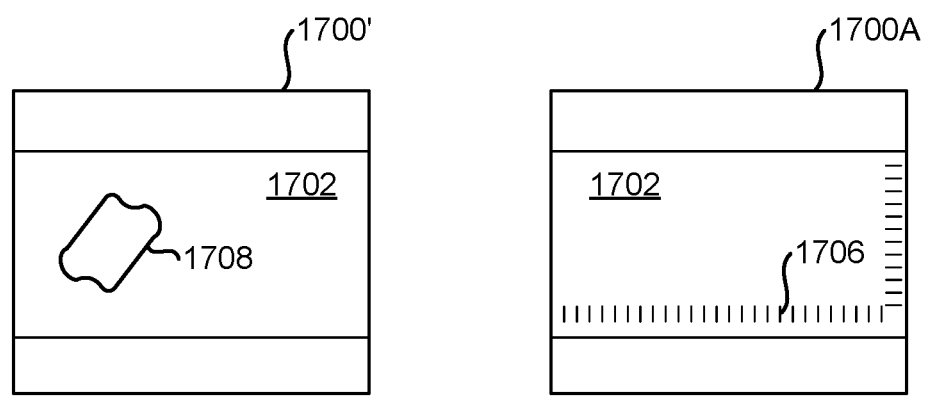

FIGS. 17A-17B schematically show an example of marking images with distances. This example can be used with one or more other examples described elsewhere herein. FIG. 17A schematically shows that an image sensor has captured images 1700 depicting a surface (e.g., an upper surface) of a conveyor belt 1702 that is here partially visible as a horizontal band against a background 1704 in the images 1700. In some implementations, the image sensor can capture the images 1700 while the conveyor belt 1702 is run through at least one entire cycle. For example, the images 1700 can be cataloged or inventoried to generate a complete visual representation of the conveyor belt 1702.

The images 1700 can be marked in one or more ways after being captured. In some implementations, each of the images 1700 can be provided with distance markers 1706 extending along the conveyor belt 1702. The distance markers 1706 can be used in determining the position of an object positioned on the conveyor belt 1702. In some implementations, the distance markers 1706 can include one or more numbers, characters, symbols, tick marks, and/or shadings. In some implementations, the distance markers 1706 can extend in one or more directions within the images 1700. For example, the distance markers 1706 can extend along a direction of travel of the conveyor belt 1702 and/or perpendicular to the direction of travel. Other ways of marking distance relative to the conveyor belt 1702 can be used.

FIG. 17B shows that an image 1700' has been captured of the conveyor belt 1702 while an object 1708 is positioned at the conveyor belt 1702. For example, the image 1700' is captured using the same image sensor with which the images 1700 (FIG. 17A) were captured. The image 1700' can be compared with one or more of the images 1700 to identify the one that matches the appearance of the portion of the conveyor belt 1702 that is visible in the image 1700'. For example, one or more conveyor patterns at the conveyor belt 1702 can be compared. Here, the comparison results in an image 1700A of the images 1700 being identified as corresponding to the image 1700'. The identification of the image 1700A can serve as the basis for one or more tracking operations with regard to the object 1708. For example, the distance markers 1706 in the image 1700A can be used to define a position of the object 1708 at the conveyor belt 1702 (e.g., by way of specifying the position of the object in relation to one or more reference points). As such, the object 1708 can be tracked while remaining in essentially the same position as in FIG. 17B.

Figure 18:
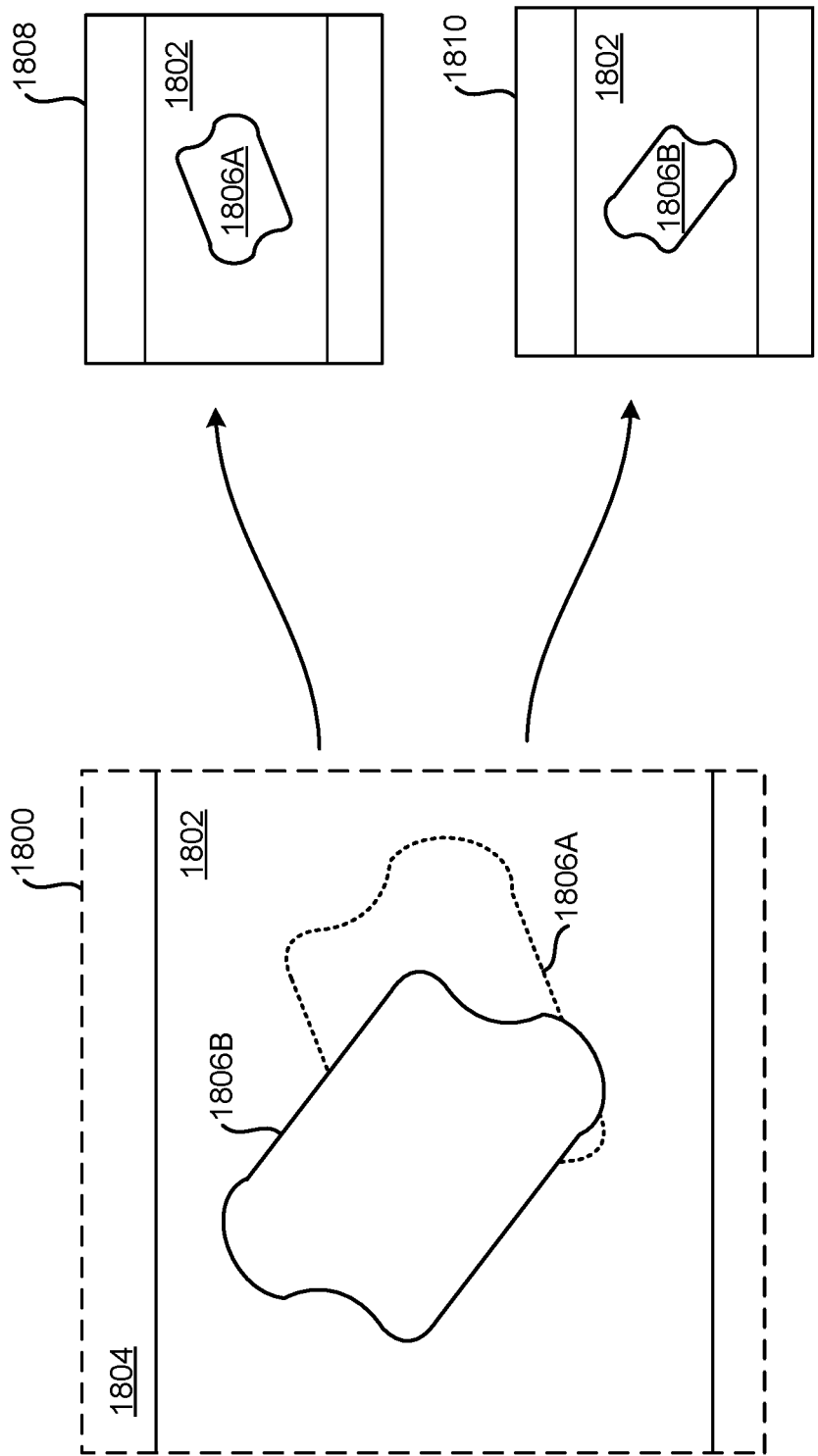
FIG. 18 shows an example of recognizing that an object that was previously detected on a conveyor belt has a new position.

FIG. 18 shows an example of recognizing that an object that was previously detected on a conveyor belt has a new position. This example can be used with one or more other examples described elsewhere herein. Here, an area 1800 is schematically indicated using a dashed rectangle. For example, the area 1800 is a portion of a processing facility that has one or more conveyors. Here, a conveyor belt 1802 is partially visible as a horizontal band against a background 1804 in the area 1800.

One or more objects can be transported using the conveyor belt 1802. Assume that an object is first detected while being placed in a position 1806A on the conveyor belt 1802. The position 1806A is here schematically indicated in that the object is drawn with a dashed outline. A tracking system can detect the object as having the position 1806A on the conveyor belt 1802. In some implementations, the tracking system can capture one or more images of the object in the position 1806A. For example, the tracking system can capture an image 1808 corresponding to the object having the position 1806A.

One or more events can cause the object to assume another position on the conveyor belt 1802 than the position 1806A. The other position assumed by the object is here schematically indicated as a position 1806B in which the object is drawn with a solid outline. Any object (e.g., a product) can be jostled or nudged one or more times due to any of multiple occurrences. For example, when a new object is being placed on the conveyor belt 1802, the object may inadvertently bump against the object that is in the position 1806A, thereby causing the object to instead assume the position 1806B. The tracking system can capture an image 1810 corresponding to an object being present at the position 1806B of the conveyor belt 1802. In order to maintain the tracking ability that existed while the object was in the position 1806A, the tracking system should detect the position 1806B as being occupied, recognize that it is the same object at the position 1806B that was at the position 1806A, and associate the position 1806B with the previously performed tracking, so that continuity can be ensured.

The tracking system can take timing into account in discovering that the position 1806B is the new position of the same object that was previously located at the position 1806A. In some implementations, when an object is placed onto or removed from the conveyor belt 1802 this can normally take at least some specific amount of time. For example, when someone removes a first object from the conveyor belt 1802, and thereafter places a second object at or near the location of the first object, this may typically take an amount of time that is on the order of multiple seconds. By contrast, when the same product is nudged or jostled into a (slightly) different position, such an occurrence may take places during a significantly shorter period of time, such as, but not limited to, less than a second. The tracking system can detect how long the change of the state takes from the position 1806A being occupied to instead the position 1806B being occupied. For example, the tracking system can compare the timing (e.g., a timestamp) of the image 1808 as being the most recent observation of the position 1806A being occupied, with the timing of the image 1810 as being the first observation of the position 1806A being unoccupied and of the position 1806B being occupied. If the change happens sufficiently quickly (e.g., in at most a relatively brief period of time shorter than those associated with substitution of a different object) then the tracking system can determine that the transition from the position 1806A to the position 1806B corresponds to the same object being displaced on the conveyor belt 1802. As such, the tracking system can continue tracking the object using the position 1806B, the new location of the object on the conveyor belt 1802.

The ability for the tracking system to distinguish object repositioning from object replacement can be provided by the way the tracking system is configured. For example, the tracking system can be programmed with detection parameters specifying applicable distances of repositioning (e.g., at most a predefined length) and/or applicable durations of repositioning (e.g., at most a predefined period of time). If a detected occurrence does not meet the programmed parameter(s) for object displacement, the tracking system can conclude that the occurrence was not an object displacement (e.g., such that the system instead registers the occurrence as the appearance of a new object on the conveyor belt). In some implementations, the tracking system can benefit from one or more aspects of artificial intelligence (e.g., machine learning) in order to make such determinations. For example, the tracking system can be trained with examples of substitutions and examples of displacements, so as to learn to distinguish them from each other. As another example, without explicit training the system can perform classification of detected occurrences and propose to categorize each of them into two or more groups (e.g., as being either a substitution or a displacement).

Figure 19:
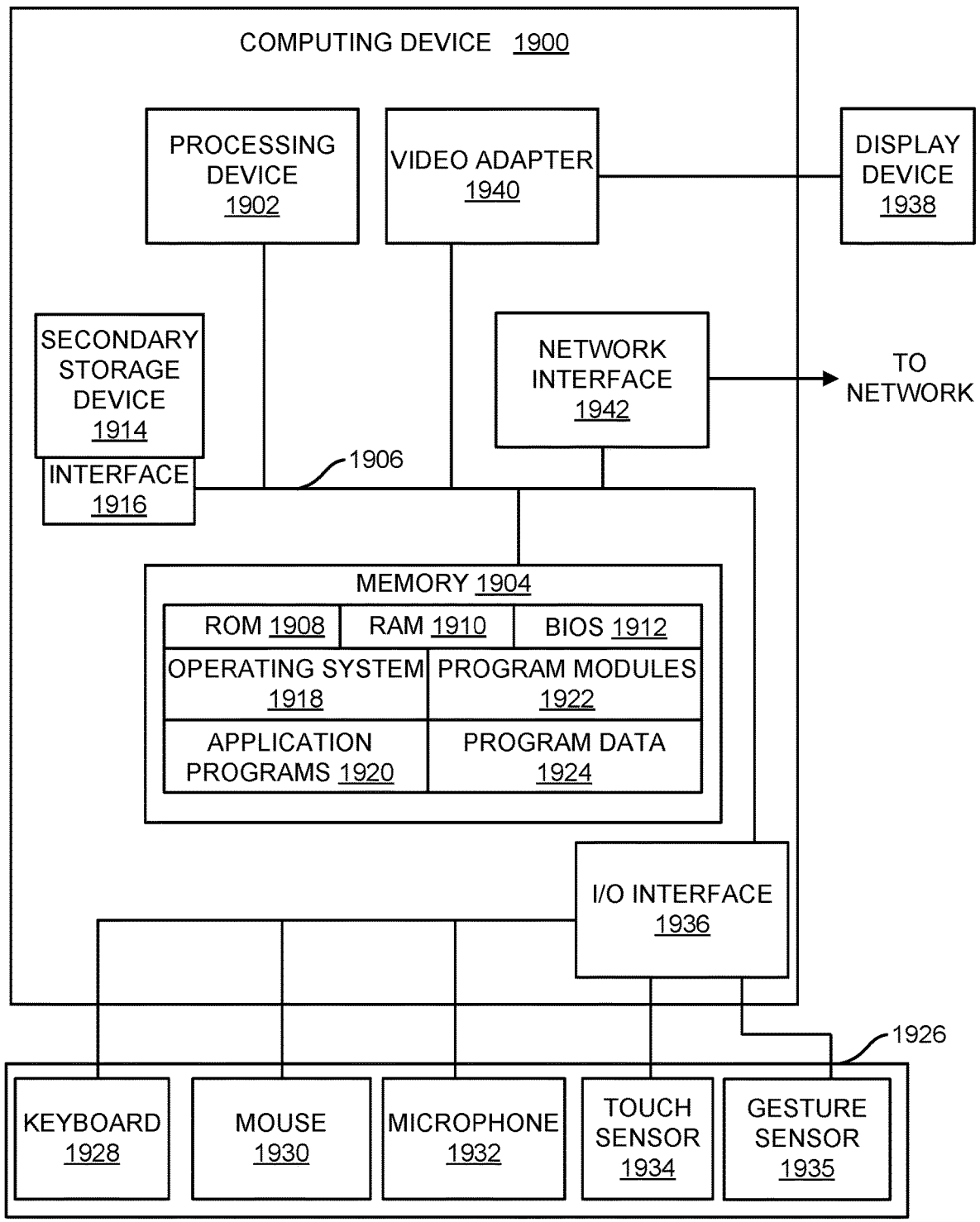
FIG. 19 illustrates an example architecture of a computing device that can be used to implement aspects of the present disclosure.

FIG. 19 illustrates an example architecture of a computing device 1900 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 19 can be used to execute the operating system, application programs, and/or software modules (including the software engines) described herein.

The computing device 1900 includes, in some embodiments, at least one processing device 1902 (e.g., a processor), such as a central processing unit (CPU). A variety of processing devices are available from a variety of manufacturers, for example, Intel or Advanced Micro Devices. In this example, the computing device 1900 also includes a system memory 1904, and a system bus 1906 that couples various system components including the system memory 1904 to the processing device 1902. The system bus 1906 is one of any number of types of bus structures that can be used, including, but not limited to, a memory bus, or memory controller; a peripheral bus; and a local bus using any of a variety of bus architectures.

Examples of computing devices that can be implemented using the computing device 1900 include a desktop computer, a laptop computer, a tablet computer, a mobile computing device (such as a smart phone, a touchpad mobile digital device, or other mobile devices), or other devices configured to process digital instructions.

The system memory 1904 includes read only memory 1908 and random access memory 1910. A basic input/output system 1912 containing the basic routines that act to transfer information within computing device 1900, such as during start up, can be stored in the read only memory 1908.

The computing device 1900 also includes a secondary storage device 1914 in some embodiments, such as a hard disk drive, for storing digital data. The secondary storage device 1914 is connected to the system bus 1906 by a secondary storage interface 1916. The secondary storage device 1914 and its associated computer readable media provide nonvolatile and non-transitory storage of computer readable instructions (including application programs and program modules), data structures, and other data for the computing device 1900.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1914 and/or system memory 1904, including an operating system 1918, one or more application programs 1920, other program modules 1922 (such as the software engines described herein), and program data 1924. The computing device 1900 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1900 through one or more input devices 1926. Examples of input devices 1926 include a keyboard 1928, mouse 1930, microphone 1932 (e.g., for voice and/or other audio input), touch sensor 1934 (such as a touchpad or touch sensitive display), and gesture sensor 1935 (e.g., for gestural input). In some implementations, the input device(s) 1926 provide detection based on presence, proximity, and/or motion. In some implementations, a user may walk into their home, and this may trigger an input into a processing device. For example, the input device(s) 1926 may then facilitate an automated experience for the user. Other embodiments include other input devices 1926. The input devices can be connected to the processing device 1902 through an input/output interface 1936 that is coupled to the system bus 1906. These input devices 1926 can be connected by any number of input/output interfaces, such as a parallel port, serial port, game port, or a universal serial bus. Wireless communication between input devices 1926 and the input/output interface 1936 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1938, such as a monitor, liquid crystal display device, light-emitting diode display device, projector, or touch sensitive display device, is also connected to the system bus 1906 via an interface, such as a video adapter 1940. In addition to the display device 1938, the computing device 1900 can include various other peripheral devices (not shown), such as speakers or a printer.

The computing device 1900 can be connected to one or more networks through a network interface 1942. The network interface 1942 can provide for wired and/or wireless communication. In some implementations, the network interface 1942 can include one or more antennas for transmitting and/or receiving wireless signals. When used in a local area networking environment or a wide area networking environment (such as the Internet), the network interface 1942 can include an Ethernet interface. Other possible embodiments use other communication devices. For example, some embodiments of the computing device 1900 include a modem for communicating across the network.

The computing device 1900 can include at least some form of computer readable media. Computer readable media includes any available media that can be accessed by the computing device 1900. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1900.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 19 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   receiving, in a computer system, a pattern record corresponding to a conveyor pattern of a conveyor belt in which patterns are randomly distributed;
   capturing, using the computer system, a first image of the conveyor belt while a first product is positioned on the conveyor belt;

comparing, using the computer system, at least part of the first image with the pattern record to identify a first corresponding portion of the pattern record for the first image;

assigning, using the computer system, a first identifier to the first product based on the first corresponding portion of the pattern record; and tracking, using the computer system, the first product using the assigned first identifier.

2. The method of claim 1, wherein the conveyor pattern comprises first and second patterns having a spatial relationship with each other, and wherein the comparison includes determining that the first pattern is visible in the first image and that the second pattern is not visible in the first image.

3. The method of claim 2, wherein the determination comprises using a distance between the first and second patterns, the distance included in the spatial relationship.

4. The method of claim 2, wherein the determination comprises using a direction between the first and second patterns, the direction included in the spatial relationship.

5. The method of claim 1, further comprising registering a carrier pattern and associating the carrier pattern with the assigned first identifier.

6. The method of claim 5, wherein registering the carrier pattern is done before the first product is placed on the conveyor belt.

7. The method of claim 5, wherein registering the carrier pattern is done based on detection of the carrier pattern at a carrier that holds the first product.

8. The method of claim 1, further comprising detecting station entry, the station entry comprising that the first product enters a station from the conveyor belt.

9. The method of claim 8, further comprising detecting, after the station entry is detected, that a second product enters the conveyor belt at the station, and associating the second product with the assigned first identifier.

10. The method of claim 9, wherein detecting the second product comprises:

capturing, using the computer system, a second image of the conveyor belt while the second product is positioned on the conveyor belt;

comparing, using the computer system, at least part of the second image with the pattern record to identify a second corresponding portion of the pattern record for the second image;

assigning, using the computer system, a second identifier to the second product based on the second corresponding portion of the pattern record; and associating the assigned second identifier with the assigned first identifier.

11. The method of claim 1, wherein tracking the first product comprises distinguishing a displacement of the first product on the conveyor belt from an occurrence that involves removal of the first product from the conveyor belt and placement of a second product on the conveyor belt.

12. The method of claim 1, wherein the pattern record is based on capturing images of the conveyor belt during an entire cycle of the conveyor belt.

13. The method of claim 12, wherein at least some of the images include distance markers, and wherein the distance markers are used in assigning the first identifier to the first product.

14. A computer program product stored in a non-transitory medium, the computer program product including instructions that when executed cause a processor to perform operations including:

receiving, in a computer system, a pattern record corresponding to a conveyor pattern of a conveyor belt in which patterns are randomly distributed;

capturing, using the computer system, a first image of the conveyor belt while a first product is positioned on the conveyor belt;

comparing, using the computer system, at least part of the first image with the pattern record to identify a first corresponding portion of the pattern record for the first image;

assigning, using the computer system, a first identifier to the first product based on the first corresponding portion of the pattern record; and tracking, using the computer system, the first product using the assigned first identifier.

15. A method performed during meat processing of an animal, the method comprising:

capturing, using a computer system, a first image of a conveyor belt while a first meat portion is positioned on the conveyor belt, wherein the first meat portion originates with the animal, the conveyor belt having a conveyor pattern in which patterns are randomly distributed;

identifying, using the computer system and based on the first image, a first pattern of the conveyor pattern as being currently covered by the first meat portion; and tracing, using the computer system, the first meat portion to the animal based on the identified first pattern.

16. The method of claim 15, wherein identifying the first pattern comprises identifying a second pattern of the conveyor pattern as being located adjacent the first meat portion.

17. The method of claim 16, wherein identifying the second pattern comprises comparing the second pattern to a pattern record corresponding to the conveyor pattern.

18. The method of claim 15, further comprising:

detecting station entry relative to a station associated with the conveyor belt; and tracking the first meat portion through the station entry to another side of the station.

19. The method of claim 18, wherein the station entry comprises that the first meat portion enters the station, and wherein tracking the first meat portion comprises associating the first meat portion with a second meat portion leaving the station.

20. The method of claim 19, wherein detecting the station entry comprises detecting that the first pattern becomes visible on the conveyor belt after the station.

21. The method of claim 18, further comprising detecting also a third meat portion as leaving the station, wherein tracking the first meat portion comprises also associating the first meat portion with the third meat portion.

22. The method of claim 18, wherein the station entry comprises that a second meat portion enters the station, and wherein tracking the first meat portion comprises associating the first meat portion with the second meat portion having entered the station.

23. The method of claim 22, further comprising identifying, before detecting the station entry, a second pattern of the conveyor pattern as being currently covered by the second meat portion, wherein detecting the station entry comprises detecting that the second pattern becomes visible on the conveyor belt after the station.

24. The method of claim 22, further comprising detecting also a third meat portion as entering the station, wherein tracking the first meat portion comprises also associating the first meat portion with the third meat portion.

* * * * *